US012521190B2

United States Patent
Higgins et al.

(10) Patent No.: US 12,521,190 B2
(45) Date of Patent: Jan. 13, 2026

(54) EXTEMPORANEOUS ROUTE PLANNING DURING LIVE ENDOSCOPIC SURGICAL PROCEDURES

(71) Applicant: The Penn State Research Foundation, University Park, PA (US)

(72) Inventors: William E. Higgins, State College, PA (US); Yuxuan He, State College, PA (US); Vahid Daneshpajooh, Swarthmore, PA (US); Qi Chang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 18/958,807

(22) Filed: Nov. 25, 2024

(65) Prior Publication Data
US 2025/0107855 A1    Apr. 3, 2025

Related U.S. Application Data

(63) Continuation of application No. PCT/US2024/012969, filed on Jan. 25, 2024.

(60) Provisional application No. 63/482,636, filed on Feb. 1, 2023.

(51) Int. Cl.
A61B 34/20    (2016.01)

(52) U.S. Cl.
CPC .................................. *A61B 34/20* (2016.02)

(58) Field of Classification Search
CPC ..................................................... A61B 34/20
See application file for complete search history.

(56) References Cited

U.S. PATENT DOCUMENTS

| | | | |
|---|---|---|---|
| 2005/0182295 A1* | 8/2005 | Soper | A61B 1/2676 600/117 |
| 2008/0183073 A1 | 7/2008 | Higgins et al. | |
| 2008/0207997 A1 | 8/2008 | Higgins et al. | |
| 2018/0153621 A1* | 6/2018 | Duindam | A61B 1/05 |
| 2019/0228528 A1 | 7/2019 | Mintz et al. | |

(Continued)

OTHER PUBLICATIONS

Ultrathin Bronchoscopic Cryobiopsy of Peripheral Pulmonary Lesions, M. Oki, H. Saka, Y. Kogure, H. Niwa, A. Yamada, A. Torii, C. Kitagawa; Department of Respiratory Medicine, National Hopspital Organization Nagoya Medical Center, Nagoya, Japan, B110 The Midas Touch Interventional Pulmonology in Thoracic Oncology / RAPiD: Rapid Abstract Poster Discussion Session / Monday, May 16/02:15 PM-03:45 PM / Room 207-208 (South Building, Level 2), Moscone Center, Online Abstracts Issue, 1 sheet.

(Continued)

*Primary Examiner* — Rochelle D Turchen
(74) *Attorney, Agent, or Firm* — Dinsmore & Shohl LLP

(57) ABSTRACT

A methodology is for deriving a guidance route to any selected site including an unplanned ROI site observed in a radiologic imaging view or endoscopic video view on an assisted-endoscopy system during a live surgical endoscopic procedure based on a preloaded initial procedure plan. The initial procedure plan can be updated by identifying a new site s at the unplanned ROI on one of graphical visualization tools of an image-guided endoscope system as a new examination destination and automatically computing the new navigation airway route that leads to the new examination destination.

18 Claims, 22 Drawing Sheets

(56) References Cited

U.S. PATENT DOCUMENTS

2019/0304129 A1   10/2019   Schafer et al.

OTHER PUBLICATIONS

Evaluation of 3D Fluoroscopy Aiding Robotic Assisted Bronchoscopy for Biopsy of Peripheral Lung Nodules, W. R. Grier, M. Saleh, E. Pickering, A. Sachdeva, V. K. Holden, F. Nasim; Division of Pulmonary , and Critical Care, University of Maryland Medical Center, Baltimore, MD, United States. B110 The Midas Touch Interventional Pulmonology in Thoracic Oncology / RAPID: Rapid Abstract Poster Discussion Session / Monday, May 16/02:15 PM-03:45 PM / Room 207-208 (South Building, Level 2), Moscone Center, 2 pages.

Manual route modification using an oblique method following automatic virtual bronchoscopic navigation, Observational Study, Takako Inoue, MDa,*, Takahisa Kawamura, MD, et all, Inoue et al. Medicine (2022) 101:17 Medicine, www.md-journal.com, 7 pages.

Virtual Bronchoscopic Navigation Improves the Diagnostic Yield of Radial-Endobronchial Ultrasound for Peripheral Pulmonary Lesions with Involved Bronchi on CT, Interal Medicine, Fumihiro Asano, et al., Intern Med 54: 1021-1025, 2015 DOI: 10.2169/internalmedicine.54.3497, 5 pages, 1021-1025, 2015 The Japanese Society of Internal Medicine.

The Feasibility of Using the "Vessel Sign" for Pre-Procedural Planning in Navigation Bronchoscopy for Peripheral Pulmonary Lesion Sampling: A Dual-Center Retrospective Study, E. Ho, et al., B110 The Midas Touch Interventional Pulmonology in Thoracic Oncology / RAPID: Rapid Abstract Poster Discussion Session / Monday, May 16/02:15 PM-03:45 PM / Room 207-208 (South Building, Level 2), Moscone Center, Online Abstracts Issue, 1 sheet.

Proceedings of SPIE, Daneshpajooh, Vahid, Ahmad, Danish, Toth, Jennifer, Bascom, Rebecca, Higgins, William, Video analysis framework for lesion detection in narrow band imaging bronchoscopy, Event: SPIE Medical Imaging, 2022, San Diego, California, United States, 9 pages.

A Multicenter Prospective Study on Addition of Ultrathin Bronchoscopy to Thin Bronchoscopy When Evaluating Peripheral Pulmonary Lesions, B110 The Midas Touch Interventional Pulmonology in Thoracic Oncology / RAPID: Rapid Abstract Poster Discussion Session / Monday, May 16/02:15 PM-03:45 PM / Room 207-208 (South Building, Level 2), Moscone Center, D. Himeji, et al., Online Abstracts Issue, 1 page.

Written Opinion of the International Searching Authority, International Application No. PCT/US24/12969, dated May 30, 2024, 8 pages.

International Search Report, International Application No. PCT/US24/12969, dated May 30, 2024, 2 pages.

* cited by examiner

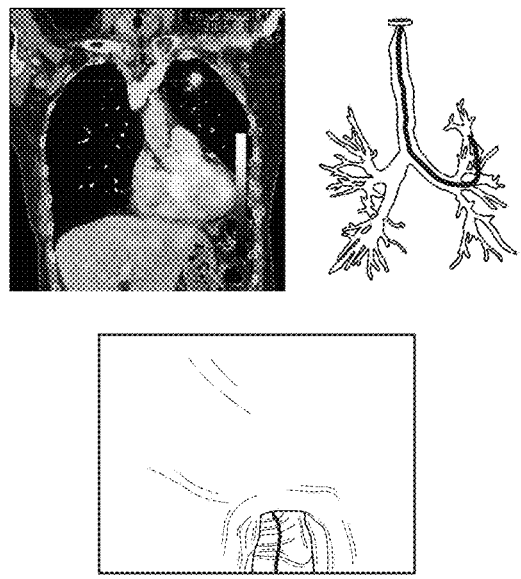
FIG. 5B
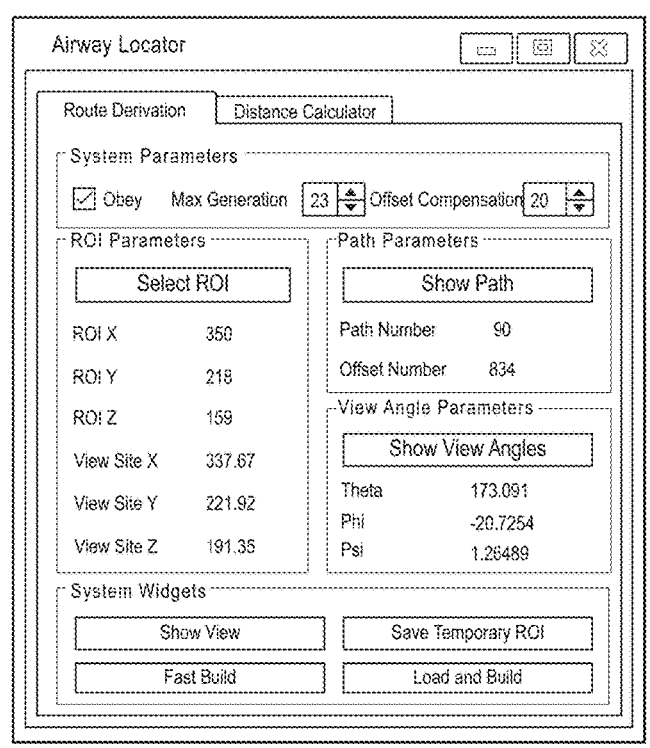

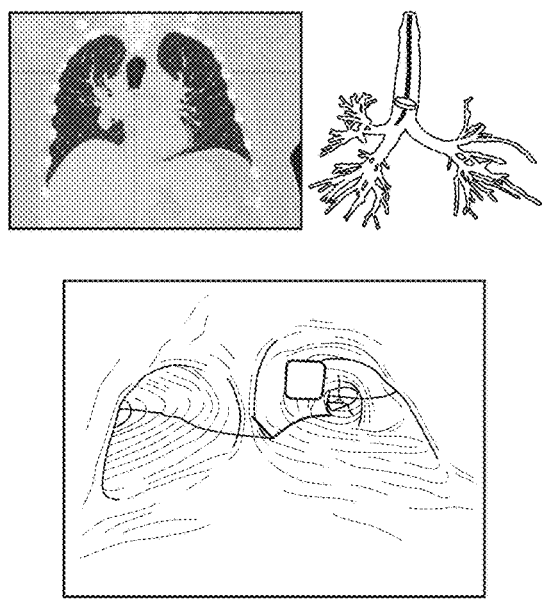
FIG. 11B
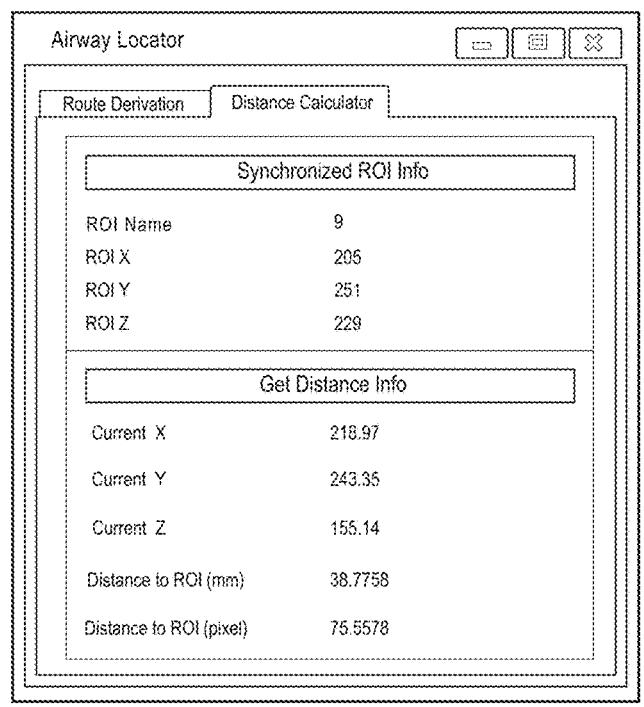

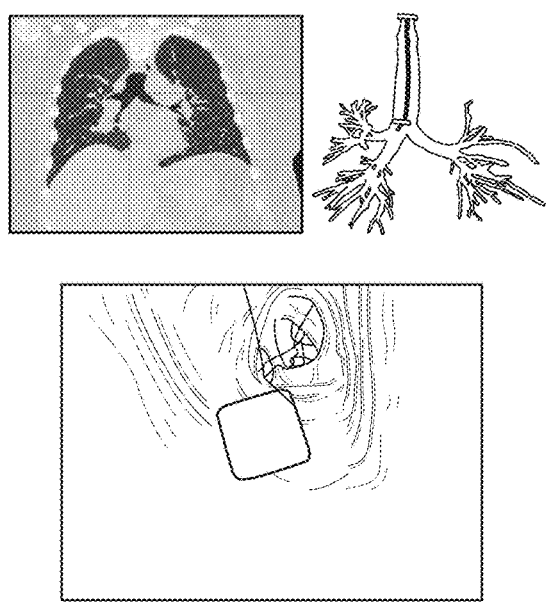
FIG. 11C
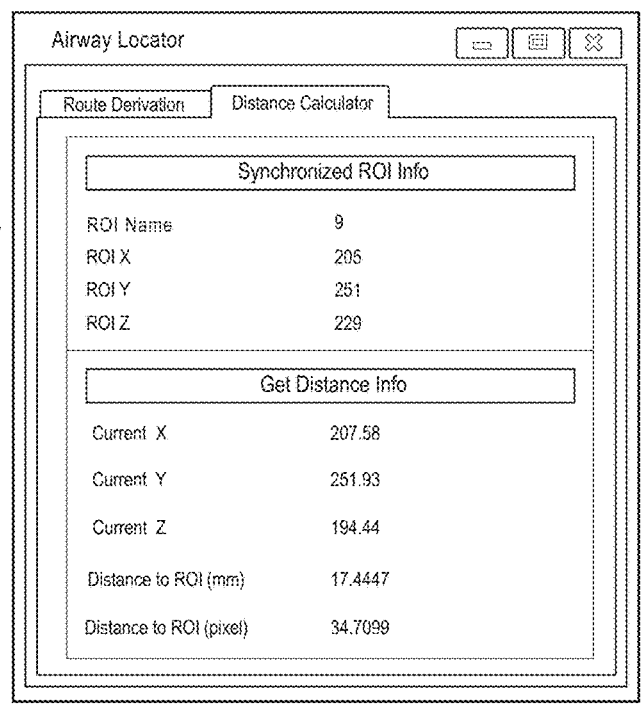

EXTEMPORANEOUS ROUTE PLANNING DURING LIVE ENDOSCOPIC SURGICAL PROCEDURES

CROSS REFERENCE TO RELATED APPLICATIONS

This application is a bypass continuation application of PCT Application No. PCT/US24/12969, filed Jan. 25, 2024, which claims priority from U.S. Provisional Patent Application No. 63/482,636, filed Feb. 1, 2023, the entire content of which is incorporated herein by reference.

GOVERNMENT SPONSORSHIP

This invention was made with government support under Grant No, #CA151433 awarded by the National Cancer Institute of the National Institutes of Health. The Government has certain rights in the invention.

FIELD OF THE INVENTION

This invention relates generally to surgical procedure planning and guidance and, in particular, to the live planning of a guidance route to a newly selected surgical site, as applicable to endoscopy.

BACKGROUND OF THE INVENTION

Many endoscopic surgical procedures often require "on the fly" examination or management of previously unplanned anatomical sites that arise during a live procedure. Example surgical domains (and the associated devices) where this situation arises include:
1. The chest and bronchoscopy.
2. The abdomen and laparoscopy.
3. The colon and colonoscopy.
4. The bladder and cystoscopy.

For our work, we focus on the lungs/chest and the problem of lung cancer management (diagnosis, staging, monitor, follow up, treatment).

Image-guided bronchoscopy systems and new robotics-assisted bronchoscopy systems are transforming the practice of bronchoscopy, especially for examining distant peripheral sites and for performing more complex chest procedures [10, 30]. To use such a system, the physician first creates a procedure plan off-line prior to the live bronchoscopy [12, 28]. To create the plan, the physician selects diagnostic regions of interest (ROIs), such as a suspect lung nodule or an anatomical site identified for treatment, on a patient's three-dimensional (3D) chest computed tomography (CT) scan or co-registered positron emission tomography (PET) scan, if available. Next, for each ROI, an airway route leading from the trachea to the ROI is derived either automatically via computer analysis or manually via visual inspection of the CT scan. Later, during the live procedure, the physician then employs their assisted-bronchoscopy system, driven by the procedure plan, to navigate the bronchoscope to each ROI along its preplanned airway route.

Many situations arise during the live procedure, however, where the physician desires to inspect some new unplanned ancillary site. Given the anatomy's complexity, the complications entailed in assessing a patient's condition—especially during a live procedure when conditions can change—and the ever-present difficulties in thoroughly assessing a patient's imaging scan offline, it is natural that such "on the fly" extemporaneous discoveries would arise. In fact, such fortuitous discoveries could dictate unforeseen adjustments to the preplanned procedure, adjustments necessary and vital for proper patient care. Below are examples of such intra-operative situations that arise in clinical practice: pt
1. An ROI's preplanned airway route leads to an airway that, during the live procedure, is revealed to be blocked or collapsed. This forces the physician to derive a new route for approaching the ROI.
2. The physician notes a site that appears especially suitable or convenient for delivering local treatment, such as cryotherapy [27]. To deliver the therapy, the physician needs to invoke a different device, which in turn requires a route for guidance to the site.
3. Because of an incomplete airway route plan for a particular peripheral ROI, the physician is often compelled to invoke radiation-intensive fluoroscopy to complete bronchoscope navigation to a final desired position [15]. This is done, even though fluoroscopy is not very accurate for verifying 3D position. A more accurate approach, without the attendant radiation exposure, is to select the desired site on CT and have a new route computed automatically.
4. The physician employs a time-consuming error-prone manual analysis—e.g., interactive CT-based virtual bronchoscopy (VB) and CT oblique section viewing—to derive an airway route to a deep peripheral site [21]. An automatic approach would be more accurate and less time consuming.

In addition to the four situations highlighted above, many other situations arise in clinical practice that require real-time intra-operative unplanned adjustments during live bronchoscopy. These situations include:
1. The physician decides it is necessary to examine a secondary small tumor, possibly within the vicinity of a primary tumor defined earlier during off-line planning.
2. The physician wishes to examine a site situated within a region depicting a diffuse-appearing ground glass opacity, as seen on the pre-operative CT scan.
3. The physician discovers a location depicting a suspiciously narrowed (stenosed) or blocked airway and would like to note its location.
4. A lymph node not predefined during offline procedure planning (i.e., in preparation for lymph node staging) is deemed necessary for examination.
5. The physician would like to produce and save an airway route leading close to the bronchoscope's current registered location, because the site reveals a suspicious CT or PET finding not observed earlier offline. Given the route, the physician can then instigate a treatment regimen at the location.
6. The physician would like to save for future reference a nearby airway location that gives a strong RP-EBUS (radial-probe endobronchial ultrasound) image of a previously unidentified extraluminal structure; i.e., the physician wishes to define an "RP-EBUS sign".
7. The physician wishes to examine an extraluminal site noted on an imaging scan during the procedure for further examination with a second supplemental bronchoscopic device, such as optical coherence tomography (OCT) or RP-EBUS.
8. The physician uses a manually determined "bronchus sign" or "vessel sign" (i.e., a visible airway or vessel noted on a 2D CT section near a desired diagnostic site) for helping to navigate the bronchoscope close to a site of interest observed on CT [1, 19]. A proper airway route leading to the desired site found automatically would be more accurate and less error prone.

9. While performing a bronchoscopic airway exam, the physician notes a sign of early lung cancer along an airway wall in the bronchoscopic video, be it standard white-light bronchoscopy, autofluorescence bronchoscopy, narrow-band imaging bronchoscopy, or optical coherence tomography bronchoscopy [4, 11, 20]. The physician would like to make a note of this site and be able to return to it for further examination and/or treatment.

10. The physician realizes that they need to work with an ultrathin bronchoscope to travel to a deep small airway—this requires a new guidance route [18].

To respond to such situations, the assisted-bronchoscopy system requires an airway route leading to the new ancillary site, computed live during procedure. Unfortunately, while automatic route planning has long been available for assisted-bronchoscopy systems for off-line planning prior to a procedure [12, 28], no such route-planning method exists for managing new diagnostic sites selected by the physician live during the bronchoscopic procedure. Also, off-line planning in general demands distinct 2D or 3D ROIs defined on an imaging scan, whereas some sites of interest don't correspond to ROIs per se, but instead correspond to locations that could only be determined during the live procedure; e.g., a site selected on CT for inspecting a diffuse ground glass opacity region or a current interior airway site observed in a bronchoscopic video view.

In summary, many surgical endoscopic procedures that require traversing complex hollow anatomical regions, such as the lung airways or abdomen, often require "on the fly" extemporaneous examination of previously unplanned anatomical sites that arise during a live procedure. Unfortunately, no method or system exists for effective and efficient live route planning to newly selected anatomical sites for an assisted-endoscopy system, be it image-guided or robotics-based.

SUMMARY OF THE INVENTION

The embodiments of the present invention provide a methodology for deriving a guidance route during a live surgical endoscopic procedure to any selected site including an unplanned ROI site in a radiologic imaging view or endoscopic video view observed on an assisted-endoscopy system's guidance display.

The embodiment of the invention includes a computational method for deriving the desired guidance route and an interactive graphical tool, dubbed the "Airway Locator," which fits within the framework of an assisted-bronchoscopy system and which helps in selecting and managing sites/regions of interest (ROIs).

Prior to a live endoscopic procedure, information such as the airway tree, airway endoluminal surfaces, and airway centerlines are computed offline using the patient's chest CT scan, and PET scan. An initial procedure plan defining an initial ROI different than the unplanned ROI and deriving suitable airway routes that lead to the initial ROI is computed offline based on the previously computed information.

When the physician gets ready to start a live endoscopic procedure, the physician might happen to notice something on the CT and would like now also go there. The physician will invoke the Airway Locator to compute a new guidance route to this unplanned site. The present method initiates an update to the initial procedure plan by identifying a new site s at the unplanned ROI on one of graphical visualization tools of an image-guided endoscope system as a new examination destination and then automatically computing the new navigation airway route that leads to the new examination destination.

In a different scenario, similarly, a procedure plan was first derived offline before the procedure, drawing on the available radiologic imaging data. During the procedure, the physician is navigating along a preplanned path when a suspect change such as a mass was observed on one of CT views. The physician decides to examine this previously unplanned site. To do this, the physician selects a new ROI site s for this mass, and then invokes the Airway Locator to compute a new guidance route to this unplanned site.

In a different scenario, a suspect lesion was observed in the endoscopic video while the physician is navigating along a preplanned path during a routine airway exam or preplanned procedure. Airway Locator can be then invoked to derive the airway guidance route using the presently disclosed method. Suspect lesion might be along the airway wall and is not observable on the CT views. The video could be from white light bronchoscopy, narrowband imaging (NBI) bronchoscopy or autofluorescence bronchoscopy.

Once a new navigation airway route is derived, the physician can preview the new navigation airway route using the graphical visualization tools of the image-guided endoscope system prior to guiding the endoscope along the new navigation airway route. An endoscope can be guided along the new navigation airway route to navigate through the hollow organ system to reach the new examination destination. The distance needed to travel from a view site to the new site can also be computed.

Any newly created ROI and associated airway route can be saved as part of overall case study for future reference.

According to the disclosed method, the airway tree centerlines comprise a set of directed paths, each path consisting of a set of view sites visited once and only once along the path, originating at the trachea and terminating at a distal airway branch, each view site consisting a vector and an imaging camera's orientation during visualization along the path. The 6-parameter vector specifies the 3D (x, y, z) positions and 3 orientation angles ($\alpha$, $\beta$, $\gamma$).

The step of automatically computing the new navigation airway route comprising: 1. finding a view site $v_c$ closest to the new site s; 2. selecting a path pi containing the view site $v_c$ among the set of directed paths; 3. deriving a compensation of $\epsilon$ view sites resulting a new view site $v_s = v_{c-\epsilon}$ as an initial final view site for a preliminary airway route $p_s$ leading to the new site s, the new view site $v_s$ preceding $v_c$ by $\epsilon$ view sites in the selected path $p_i$, the preliminary airway route $p_s$ meeting a constraint requirement; 4. computing the vector $z = s - v_s$ for the new site s that starts at $v_s$ and points at site s, therefore obtaining a final view site $v_f$ for the preliminary airway route $p_s$; and replacing $v_s$ with the final view site $v_f$ in the preliminary airway route $p_s$, providing the new navigation airway route leading to new site s.

The constraints include airway dimensions and dimension of a tip of the endoscope. The constraint requirement includes the tip of endoscope must be able to fit through the airways.

The new site s may be identified on a 2D CT section, a fused 2D CT/PET section, a sliding thin-slab view, a narrowed location noted in the VB renderer, a 2D magnetic resonance imaging section, or a location along an airway wall in a video stream view.

A second supplemental device which can fit through the airways to travel to the new site might be used to navigate the new navigation airway route to further diagnosis or treat the new ROI site. The second supplemental device is selected from optical coherence tomography probe, cryotherapy probe, neodymium-doped yttrium aluminum garnet (Nd:Yag) laser probe for diagnose or treatment.

The present methodology fits smoothly into the live clinical work flow and could be especially useful when an unexpected situation arises during a live assisted-bronchoscopy procedure.

The present methodology provides a unique approach for planning guidance routes for endoscopic navigation through a hollow organ system to new and previously unplanned anatomical sites of interest.

The hollow organ system may be the lung airways or hollow areas in a colon, stomach, bladder, or pelvis/abdomen.

The endoscope may be a bronchoscope, colonoscope, laparoscope, or cystoscope.

The ROI may be a suspect tumor, cancer nodule, suspicious airway wall site, a location for treatment delivery, an injury site along an organ wall, or a simply a location for general visual examination.

The radiologic imaging data is a chest CT scan, PET scan, or magnetic resonance imaging scan.

Examination of the ROI may involve performing a visual assessment of the ROI, delivering treatment to the ROI, or collecting anatomical tissue from the ROI by the endoscope operator.

In one embodiment of the invention, an automatic method is able to derive in real-time a guidance route leading to a site of interest defined live at the time of the procedure. In the second embodiment, a software system, which interfaces to an existing image-guided bronchoscopy system, is available for user interaction when defining a new site of interest and creating the associated route. The software runs on a Windows-based PC. The software and methodology could also be adapted to many other surgical applications that entail the navigation of an endoscope through a hollow organ system for the purposes of examination, biopsy, diagnosis, monitoring, or treatment of ROIs.

The physician interacts with the Airway Locator and the assisted-bronchoscopy system's display live during the procedure. When a site is selected on one of display's views, the Airway Locator computes the desired airway route leading to the site in real-time. By having the Airway Locator automatically derive an airway route to such a site "on the fly" (extemporaneously) during the live procedure, the physician can then immediately:
1. Have the bronchoscope guided to the site for closer inspection.
2. Make real-time surgical decisions on how to diagnose, examine, or treat a patient, based on previously unplanned procedural adjustments.
3. Save observed findings for future reference and have a route for revisiting to the site during a subsequent bronchoscopy.

BRIEF DESCRIPTION OF THE DRAWINGS

FIGS. 5A-5D show an example of extemporaneous airway route computation and subsequent guidance. Left-Top-Left: fused 2D PET/CT coronal section (color bar gives PET SUV scale). Left-Top-Right: 3D Airway Tree Rendering. Left-Bottom: endoluminal renderer (VB viewer). Right: Airway Locator interface. FIG. 5A is a system view at the beginning of preplanned bronchoscopy. FIG. 5B is a system view after deriving a route for unplanned ROI site. FIG. 5C is a system view of guided navigation along the new airway route towards the unplanned ROI site. FIG. 5D is a system view at the end of the navigation when the unplanned ROI site is reached;

FIG. 7A shows 2D CT sagittal section. FIG. 7B shows 2D CT coronal slab view. FIG. 7C shows 3D Airway Tree Rendering. FIG. 7D shows Airway Locator interface;

FIG. 8A is a system view at the proximal end of the trachea. FIG. 8B is a system view at the distal end of the trachea; FIG. 8C is a system view at the right main bronchus. FIG. 8C is a system view at the right secondary bronchi;

FIG. 10A is 2D CT Coronal section. FIG. 10B is 2D CT Sagittal section. FIG. 10C is 3D Airway Tree Rendering. FIG. 10D is Airway Locator interface;

FIGS. 11A-11C show guided navigation along the computed airway route. Left-Top-Left view is 2D CT coronal section. Left-Top-Right view is 3D Airway Tree Rendering. Left-Bottom view is endoluminal renderer (VB view). Right view is Airway Locator interface. FIG. 11A is a system view at the proximal end of the trachea. FIG. 11B is a system view at the distal end of the trachea. FIG. 11C is a system view at the last view site of the airway route;

DETAILED DESCRIPTION OF THE DRAWINGS

Figure 1:
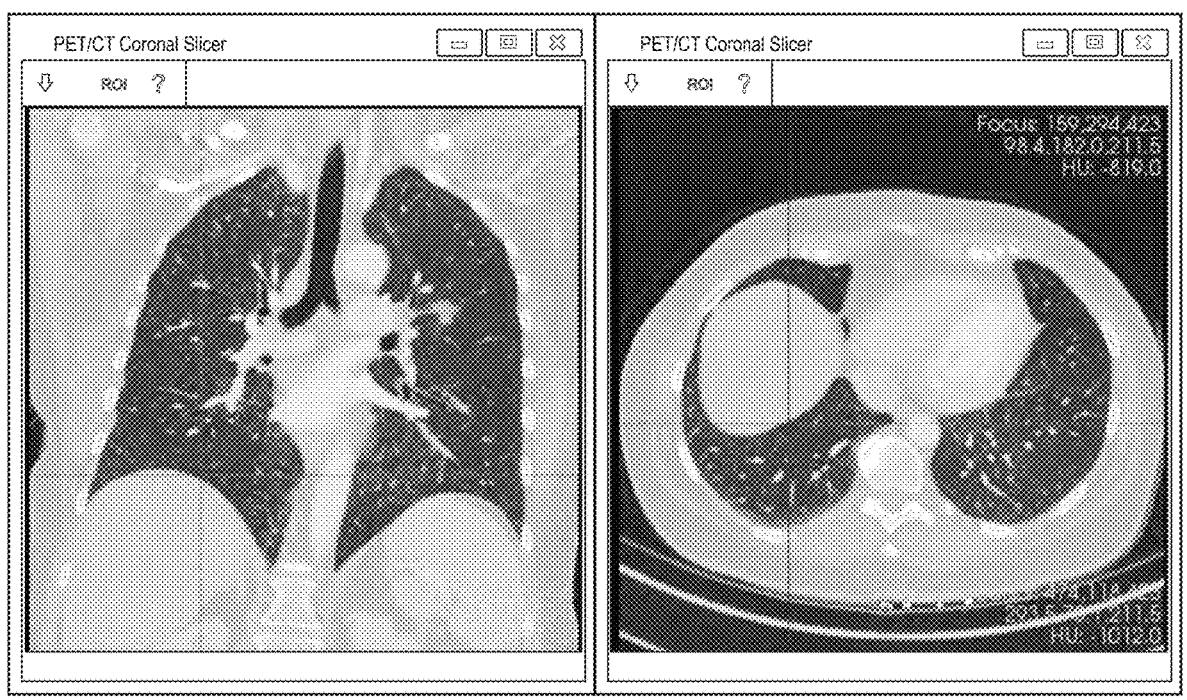
FIG. 1 shows a Physician selected ROI site in the right lung near the diaphragm on the PET/CT Coronal Slicer (left view) and on the PET/CT Transverse Slicer (right view)

According to embodiments of the present invention, a planning method and associated interactive tool, the Airway Locator, are provided for deriving a guidance route to any newly selected site of interest in real-time "on the fly" (extemporaneously) during a live surgical endoscopic procedure. Subsequently, the endoscope can then be guided along the derived guidance route to navigate through a hollow organ system to reach the site of interest.

The present invention offers a unique way for generating real-time guidance routes to unplanned newly selected sites of interest.

1. Top-Level Overview

The Airway Locator methodology can be incorporated into an existing multimodal image-guided bronchoscopy system developed in our laboratory for planning and guiding multimodal bronchoscopic procedures [2, 12, 16, 17, 33].

To begin, the physician first follows the standard two-phase procedure required by the image-guided bronchoscopy system: 1) Offline Procedure Planning; followed by 2) Live Guided Bronchoscopy. These two phases are elaborated on below.

Phase 1—Offline Procedure Planning—This requires the following standard operations.
  (a) Using the patient's chest CT scan, and PET scan, if available, automatically compute the airway tree, airway endoluminal surfaces, and airway centerlines.
  (b) Derive the usual procedure plan tailored to the assisted-bronchoscopy system. This entails defining clinically relevant ROIs and deriving suitable airway routes that lead to the ROIs.
  (c) Save all computed quantities, such as the procedure plan, airway tree, and other quantities in a case study data structure [17].

Phase 2—Live Guidance—Standard procedures for this phase appear below.
  (a) In the surgical suite, load the procedure plan and initialize the assisted-bronchoscopy system's guidance display. The display, in general, includes various visualization tools depicting 2D CT/PET sections, CT-based virtual bronchoscopy (VB) renderings, a global 3D airway tree rendering, real-time video streams from the videobronchoscope or, if used, endobronchial ultrasound, along with text-based guidance instructions.
  (b) The physician performs the preplanned bronchoscopic procedure.

Regarding the processes summarized above, we use previously validated methods for CT/PET lung image processing for creating procedure plans [6, 9, 12-14, 23, 24, 32]. In addition, we draw upon previously created 2D and 3D graphical tools for radiologic image viewing and video analysis [2, 8, 17, 29].

As the physician performs the preplanned bronchoscopic procedure outlined above, unexpected events or observations often arise. In particular, the physician encounters a finding on a displayed view that piques the physician's interest or that causes the physician to wish to alter the course of the procedure. For either general situation, the physician now desires or deems it vital to guide the bronchoscope close to the newly discovered unplanned site for a closer inspection.

The situation above necessitates the use of the methodology of present disclosure; i.e., it requires an "on the fly" extemporaneous update to the existing procedure plan, previously constructed offline. The top-level steps for the present methodology are summarized below.

Live "On the Fly" Procedure Plan Update
  1. To initiate a change/addition to the existing predefined procedure plan, the physician selects the site on one of the graphical visualization tools shown on the assisted-bronchoscopy system's display. The site could appear on a 2D CT section, fused 2D CT/PET section, sliding thin-slab view, a narrowed location noted in the VB renderer, or a location in a video stream view.
  2. The physician signals the Airway Locator that they wish to consider the newly selected ROI site for bronchoscopic examination. This activates the Airway Locator.
  3. The Airway Locator automatically computes the airway route leading to the site, via the method discussed more fully in Section 2 below.

Note that the selected sites can be at any arbitrarily selected orientations, as noted in the viewer used for designating a site.

After the new route is derived, the physician can use the assisted-bronchoscopy system to guide the navigation of the bronchoscope to the new site, following the airway route just computed. Also, prior to this navigation, the physician can preview the route derived by the Airway Locator using the assisted-bronchoscopy system's display. Finally, the physician can save any newly created ROI and associated airway route as part of the overall bronchoscopy case study for future reference.

2. Route Computation

Per step 3 above, an automatic method integrated into the Airway Locator performs a series of calculations to determine the new route. To begin, the method draws on the airway tree, surfaces, and centerlines previously computed and saved as part of the case study during the off-line planning stage.

Note that the precomputed airway centerlines consist of a set P of N directed paths $p_i$; i.e., $$P = \{p_i, i = 1, 2, \ldots, N\}. \tag{1}$$

Each path $p_i \in P$ begins in the trachea and travels to successively deeper (higher generation) adjacent airway branches until it terminates at one of the N distinct distal airway branches constituting the segmented airway tree. The path $p_i$ in turn consists of a unique set of contiguous view sites $v_j$, originating in the trachea, visited once and only once along the path, and terminating at a view site $v_{D_i}$ in the $i^{th}$ distal airway branch; i.e., $$p_i = \{v_1, v_2, \ldots, v_{D_i}\}, \tag{2}$$

where each view site $v_j \in V$, V denotes the complete set of view sites needed to constitute all of the centerlines spanning the airway tree, and $v_1$, located in the trachea, is always the first view site starting a path.

A view site consists of: 1) a 6-parameter vector specifying the 3D (x, y, z) position and 3 orientation angles (α, β, γ); and 2) an up vector specifying an imaging camera's orientation during visualization along the path. Thus, overall, the data structures {P, V}, which represent the airway centerlines precomputed during the earlier off-line planning phase, serve as additional general inputs. Note that all definitions above follow the standards adopted for the airway centerlines, branches, and view sites, as described in [12, 22].

The goal now is to compute an airway route leading to site s selected by the user in one of the guidance system's display tools during the live procedure. This is done as follows:

1. Find the view site $v_c \in V$ that is closest to site s.
2. Identify a path $p_i$, i=1, 2 ..., N, that contains $v_c$. Many paths could be feasible. Any of these can serve as the selected $p_i$.
3. As in [12], the bronchoscope tip must be able to fit into the airway at or near $v_c$. To satisfy this requirement, the method draws on the tip and airway dimensions and employs constraints to find feasible paths, as described in [12]. In addition, we also derive a compensation of $\epsilon$ view sites. This gives $v_s = v_{c-\epsilon}$ as an initial final view site for the new airway route $p_s$ leading to site s.

More clearly, view site $v_s$ precedes $v_c$ by $\epsilon$ view sites in the selected path $p_i$; i.e., $$\underbrace{v_s, v_{s+1}, \ldots, v_{c-1}, v_c}_{\epsilon \text{ view sites}} \in p_i. \qquad (3)$$

This gives a preliminary airway route $p_s$ that contains all view sites in $p_i$ up to $v_s$:

$$p_s = \{v_1, \ldots, v_{s-1}, v_s\}. \qquad (4)$$

4. Compute a vector $z = s - v_s$ that starts at $v_s$ and points at site s.
5. Compute Euler angles $(\psi, \theta, \phi)$ by solving the rotation matrix obtained from the current orientation angles $(\alpha_{v_s}, \beta_{v_s}, \gamma_{v_s})$ between z and $v_s$.
6. Create a new view site $v_f = (x_s, y_s, z_s, \psi, \theta, \phi)$, where $(x_s, y_s, z_s)$ are the 3D position coordinates for $v_s$.
7. Replace $v_s$ with new view site $v_f$ in preliminary path $p_s$. This gives the final desired airway route leading to new location s $$p_s = \{v_1, \ldots, v_{s-1}, v_f\} \qquad (5)$$

During later navigation along new route $p_s$, the physician may wish to know the remaining distance to reach new ROI site s. Thus, during live guided navigation, the Airway Locator provides feedback on site ROI s's position $(x_s, y_s, z_s)$, current view site v position $(x_v, y_v, z_v)$, and distance d from v to r.

3. Airway Locator Implementation

The Airway Locator tool is an interactive mechanism used to invoke the creation of a new guidance route to an unplanned newly observed anatomical site noted during a live bronchoscopy procedure. The tool is integrated into an existing image-guided bronchoscopy system referred to as the Virtual Navigator [2, 12, 17, 33].

The Airway Locator is always used in tandem with other Virtual Navigator visualization tools. Also, as described earlier, it requires the off-line computation of an initial procedure plan, prior to the live guided bronchoscopy procedure.

To use the Airway Locator during a live guided bronchoscopy with the Virtual Navigator, the following steps are required:
1. Load the off-line procedure plan into the Virtual Navigator.
2. Invoke any desired Virtual Navigator tools on the guidance system's display. Examples of these tools include [2, 8, 9, 12, 16, 17, 29, 33]: multimodal PET/CT 2D section viewers, sliding thin slab viewers, tube viewer, 3D airway-tree surface renderer CT-Video Match tool, endoluminal VB renderer, 2D CT-projection tools, and video analysis tools. For the PET/CT, slab, and projection tools, transverse, coronal, and sagittal orientations can be considered. The Airway Locator is also invoked at this time.

This sets up the guidance computer's display for the live procedure.
3. The physician now performs the guided bronchoscopy as planned offline.
4. During the procedure, if the physician sees a new ROI or site of interest, they then perform the following operations:
    (a) The physician picks a site inside the desired new ROI in any invoked visualization tool; this sets the view state of Virtual Navigator system to the location of the newly selected ROI. This ROI site will serve as the target destination for a new guidance route.

Figure 2:
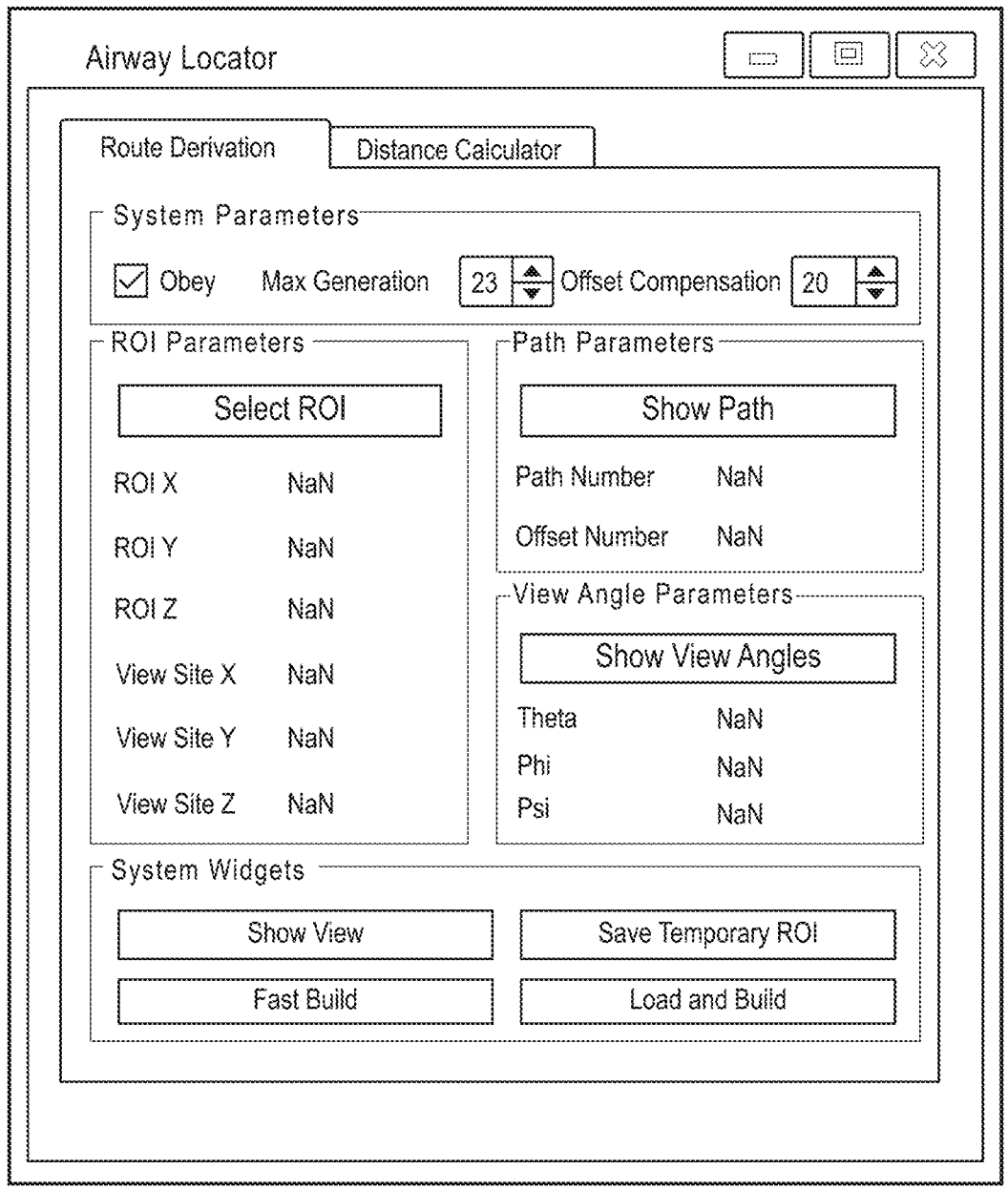
FIG. 2 shows Airway Locator tool's Route Derivation tab.

FIG. 1 shows an example of selecting a site in the right lung near the diaphragm. The Physician selects an ROI site in the right lung near the diaphragm on the PET/CT Coronal Slicer. The viewer indicates the site by red cross hairs and the x-y-z coordinates within the CT scan. This selected site is also shown on the PET/CT Transverse Slicer.
    (b) The physician now interacts with the Airway Locator tab to derive the desired route—see FIG. 2. Before any actions are taken, all fields in this tab are blank (labeled "NaN"). This can be done two ways:
        i. Step by Step: The "Select ROI", "Show Path" and "Show View Angles" buttons are pressed in succession to select the ROI site and derive all necessary information needed for the new airway route.
        ii. Fast Build: All computation steps are performed in succession at once to derive the airway route.

The final results are the new guidance route and a 3D cuboid graphical marker that can be used to represent the ROI site on the Virtual Navigator system display.

Figure 3:
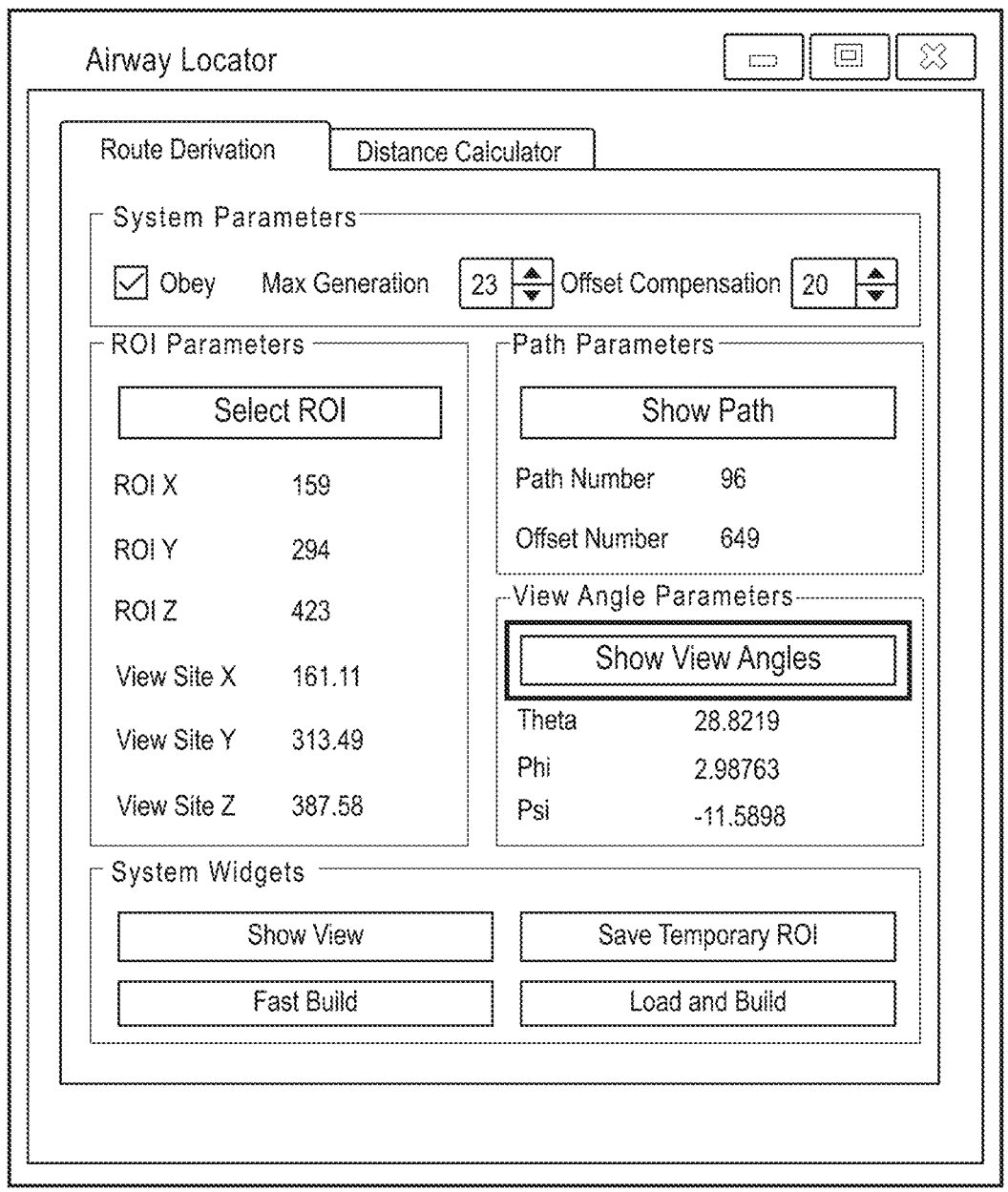
FIG. 3 shows using the Airway Locator to derive the desired guidance route to the ROI site selected in FIG. 1.

FIG. 3 shows sample output after computing the route. For the site selected in FIG. 1, the user executes all steps needed to derive the desired new airway route leading to the ROI. All parameters specifying the new route are now filled in to the dialog. The parameters indicate the ROI sites x-y-z coordinates, the original path $p_i \in P$ used to construct the new route, offset number of optimal viewing site, and the view angles at the optimal view site.
    5. If desired, the physician can now preview a movie of the new route by first invoking "Show View" on the Airway Locator's Route Derivation tab and interacting with the Virtual Navigator's standard movie controls to play the route on the system display. This action also prepares the Virtual Navigator for guided bronchoscopic navigation to the new ROI site.

Figure 4:
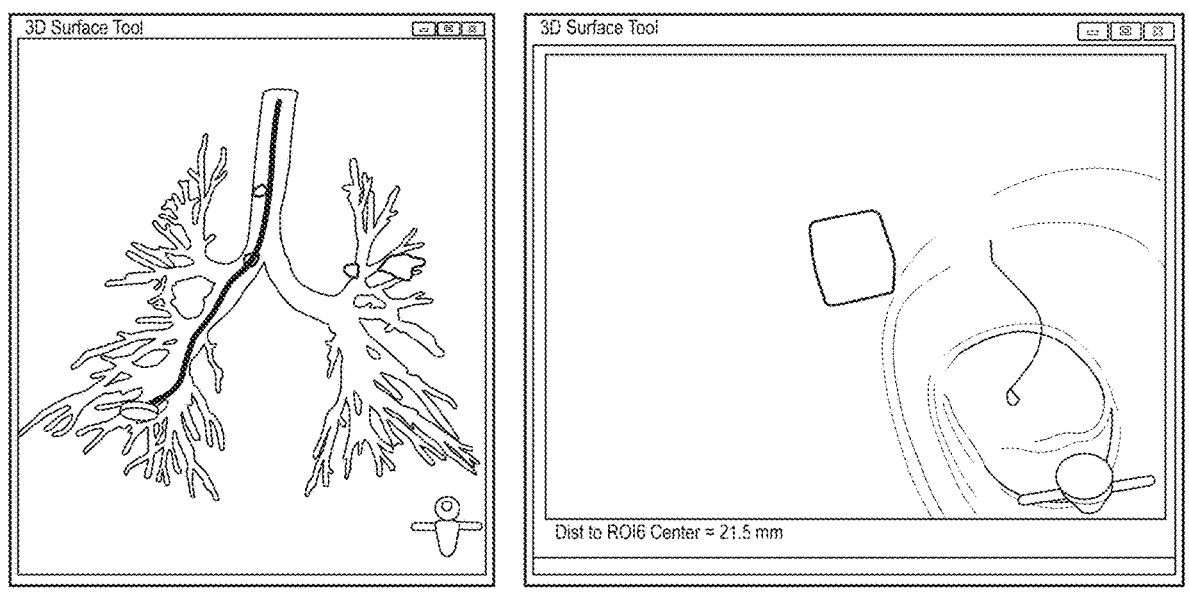
FIG. 4 shows viewing the selected ROI and its newly computed guidance route in the Virtual Navigator's 3D Surface Tool and Endoluminal Renderer.

FIG. 4 depict an example preview at a location within 21.5 mm of the ROI site's location viewing the selected ROI and its newly computed guidance route in the Virtual Navigator's 3D Surface Tool and Endoluminal Renderer. The blue line indicates the new route. The orange cuboid on the 3D Surface Tool and green cuboid in the Endoluminal Renderer indicate the ROI site. The orange cylinder icon and green needle show the current system viewing location for both visualization tools—the system is positioned near the final destination on the route at a distance of 21.5 mm from the ROI site, as seen in Endoluminal Renderer. Note that the other blue ROIs depicted in the 3D Surface Tool correspond to preplanned ROIs defined offline before the live procedure.

Lastly, the physician can save the new ROI site and route as part of the case study for future reference.

6. The physician can now perform the guided bronchoscopy procedure using the new guidance route. During guided navigation, the physician can use the Airway Locator's "Distance Calculator" tab to view the distance to travel to the new ROI site. The application examples in the next section illustrate this feature.

4. System Implementation

The present disclosure, which includes the path planning method and associated Airway Locator software module, is integrated into an existing multimodal system for the planning and guidance of bronchoscopy referred to as the Virtual Navigator [2, 3, 5, 7-9, 12, 16, 17, 22, 25, 33, 34]. The Virtual Navigator environment consists of a suite of tools that facilitate the standard two-phase work flow for completing a live image-guided bronchoscopy procedure. The Virtual Navigator can take in the following data sources; 1) chest CT scan; 2) PET/CT studies, consisting of a whole-body PET scan and chest CT scan; 3) standard white-light bronchoscopic video; 4) convex-probe endobronchial ultrasound video; 5) radial-probe endobronchial ultrasound video; 6) autofluorescence bronchoscopy video; and 7) narrow-band imaging bronchoscopy video. Tools exist for CT/PET analysis, off-line procedure planning, deformable registration of CT and PET scans, off-line CT/PET visualization, image-guided bronchoscopy (with and without endobronchial ultrasound), and multimodal video analysis. The guidance system software features a large number of tools for image visualization and user interaction, as described in the references.

The software runs on a Windows PC and interfaces to the bronchoscopy hardware during live procedures. The software was written in C++ using Microsoft Visual Studio. In our most recent work, we performed software development and system tests using a Dell Precision 7920 tower (64-bit Windows 10, 64 GB RAM, Intel Xeon Gold 6138 20-core 2.0 GHz), including an NVIDIA RTX 2080 Ti graphics card and a Matrox ClarityUHD frame grabber. The Virtual Navigator software draws on many libraries including VTK, Qt, and OpenCV. Many computationally intense functions fraw upon CUDA and the GPU.

All software for the current invention was developed and tested within this environment.

5. Application Examples

Application examples are provided herein that illustrate various reductions to practice of the invention.

Example 1: Extemporaneous Observation of a Tumor

FIGS. 5A-5D give a complete example for a lung cancer patient (case 21405-108). For each of FIGS. 5A-5D, Left-Top-Left is fused 2D PET/CT coronal section (color bar gives PET SUV scale); Left-Top-Right is 3D Airway Tree Rendering; Left-Bottom is endoluminal renderer (VB viewer) and Right is Airway Locator interface. All views synchronized to the same location during guided bronchoscopy as indicated by: 1) cross-hairs on the PET/CT view; 2) orange bronchoscope tip icon on the blue airway guidance route; 3) blue line on the VB view; 4) quantitative data in the Airway Locator tool.

The patient, who had a joint 3D CT/PET study, was enrolled under informed consent at our University Hospital. A procedure plan was first derived off-line before the procedure, drawing on the available radiologic imaging data. Each of FIGS. 5A, 5B, 5C and 5D depicts a different time point during a simulated bronchoscopy using our image-guided bronchoscopy system.

Figure 5A:
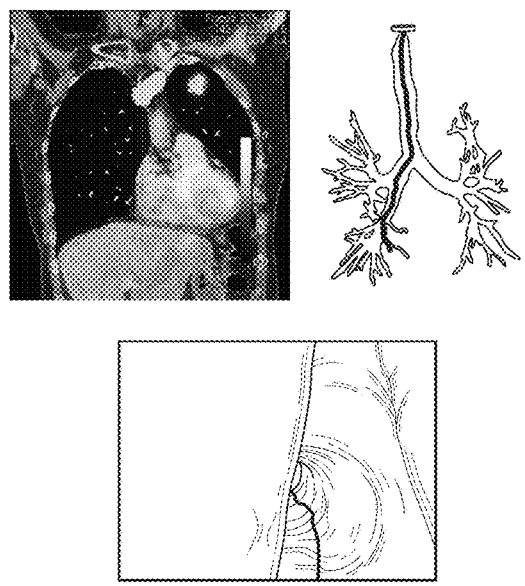
Figure 5A:
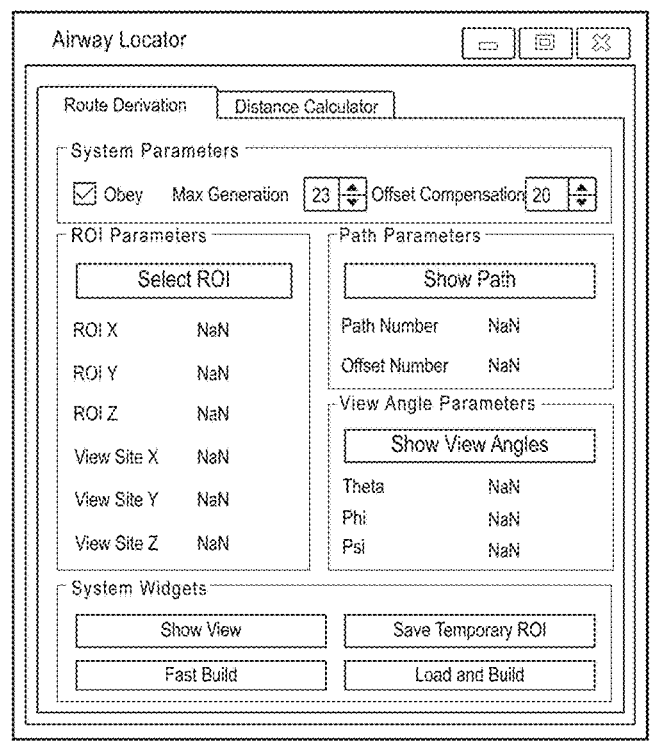
Figure 6A:
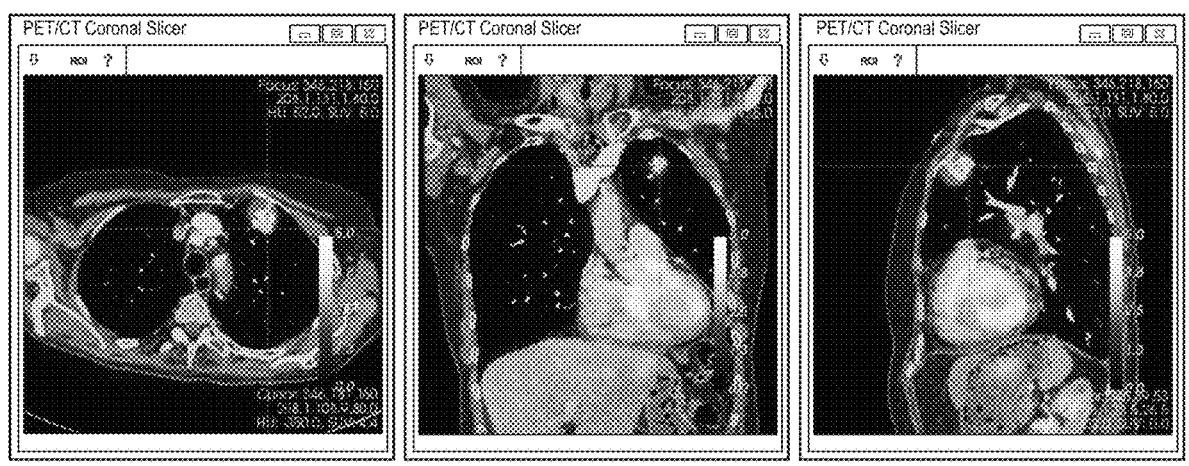
FIG. 6A shows that an ROI site (suspected tumor) is selected on a coronal PET/CT Slicer view and observed on all three PET/CT viewers (transverse, sagittal, coronal)
Figure 6B:
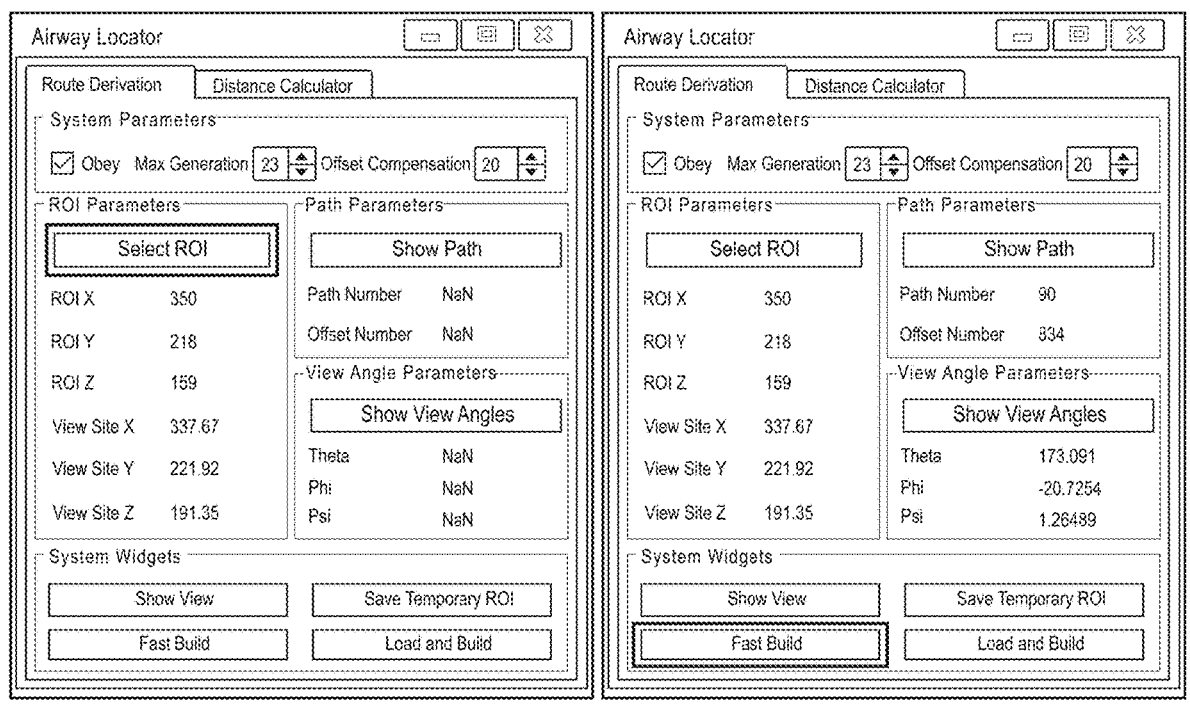
FIG. 6B shows that the physician signals the Airway Locator that this is a new site of interest and creates a route, which is shown in FIG. 5B.

FIG. 5A depicts the state of the guidance system's display during the beginning of preplanned bronchoscopy. The physician is navigating along a preplanned path p and has reached view site $v_{15}$ on the path at the base of the trachea's apex. This position is indicated on the PET/CT section by red cross-hairs, while green annotations indicate 3D location $(x_{15}, y_{15}, z_{15})$, CT HU (Hounsfield Units) value and PET SUV (standardized uptake value). It is also indicated by the orange cylinder icon on the blue line representing path p in the 3D Airway Tree Rendering. Finally, the VB view depicts the current interior airway view at $v_{15}$. Lastly, the Airway Locator is currently in its initialized state. Notably at this position, the PET/CT view apparently shows a cancerous mass in the left upper lobe—the physician decides to examine this previously unplanned site. To do this, the physician selects a new ROI site s for this tumor, as indicated by the red cross-hairs, and then invokes the Airway Locator to compute a new guidance route to this unplanned site, as shown in FIGS. 6A and 6B. As seen in FIG. 6A, an ROI site (suspected tumor) is selected on a coronal PET/CT Slicer view and observed on all three PET/CT viewers (transverse, sagittal, coronal). The physician signals the Airway Locator that this is a new site of interest and creates a route, as seen in FIG. 6B. After the physician hits the "Fast Build" button on the Airway Locator, the tool immediately computes new airway route $p_s$ leading to selected site s.

After the physician next hits "Show View" in the Airway Locator, the new route $p_s$ now appears in the 3D Airway Tree and VB view, initialized at the beginning of the route, as seen in FIG. 5B. The Airway Locator also gives details on the final view site $v_f$ for route $p_s$. To ensure that the bronchoscope will be able to capture a complete view of s at the end of route $p_s$ during later guided navigation, we employed an offset compensation $\epsilon=20$ voxels. This ensures that terminal view site $v_f$ is situated back≈10 mm from the airway wall (CT resolution≈0.5 mm in x, y, and z for this case).

Figure 5C:
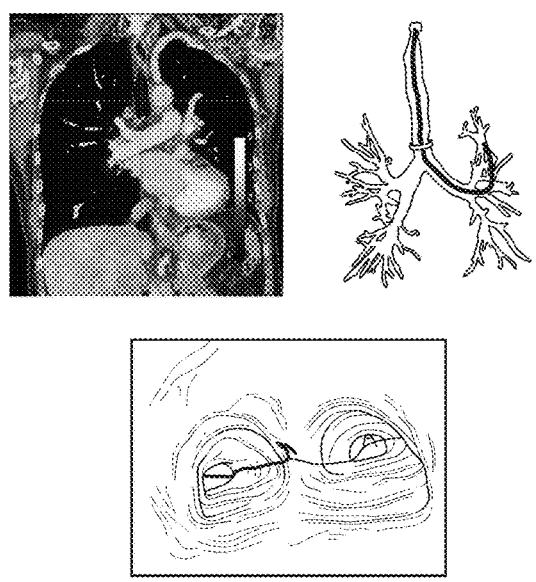
Figure 5C:
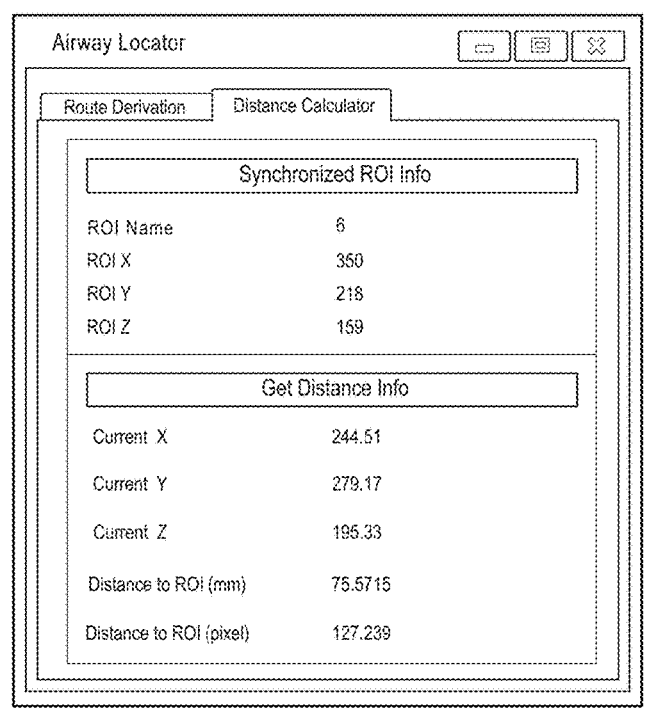
Figure 5D:
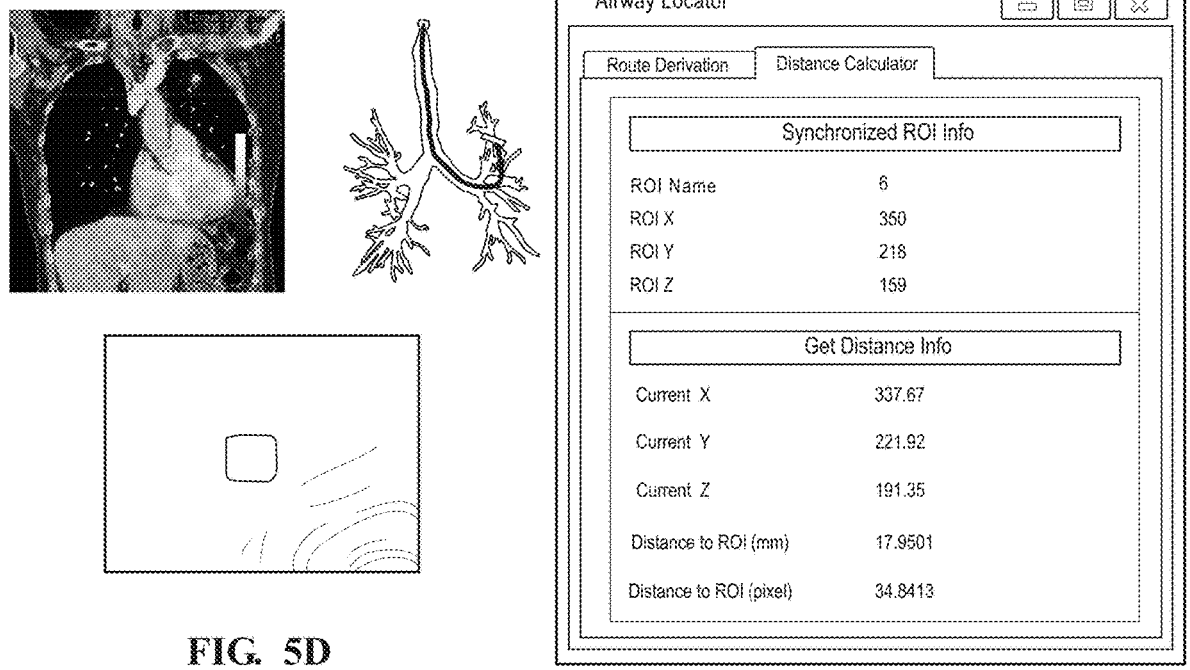

Next, FIG. 5C shows guided navigation along the new airway route towards the new site s and depicts the guidance system's state on $p_s$ upon reaching the main carina (view site $v_{291}$). The Airway Locator provides information on the bronchoscope's current 3D location and remaining distance to ROI site s, as shown by the Airway Locator's "Distance Calculation" tab. Finally, FIG. 5D depicts the system display upon reaching site s (view site $v_f=v_{834}$). The PET/CT viewer gives an indication as to how close the bronchoscope is able to navigate toward s, the 3D Airway Tree shows the location and orientation of the bronchoscope tip as it points toward s, and the VB view depicts a green cuboid ROI icon denoting site s. Lastly, the Airway Locator points out that the bronchoscope has navigated to within 17.9 mm of the suspect tumor site s.

Example 2: "On-the-Fly" Guided Bronchoscopy Toward a Tumor

FIGS. 7A-7D and 8A-8D illustrate a guided bronchoscopy to a previously unplanned ROI. For the example, we used a 3D printed airway phantom together with the 3D CT images from a lung cancer patient (case 21405-116), who was enrolled under informed consent at our University Hospital. A procedure plan was first derived offline before the procedure, drawing on the available radiologic imaging data. During the procedure (the airway phantom served as the patient), a new ROI s was selected on a 2D sagittal CT section and the corresponding new airway guidance route $p_s$ was then derived.

Figure 7A:
FIGS. 7A-7D shows another example of "On the Fly" guidance for the image-guided bronchoscopy system after ROI selection.
Figure 7B:
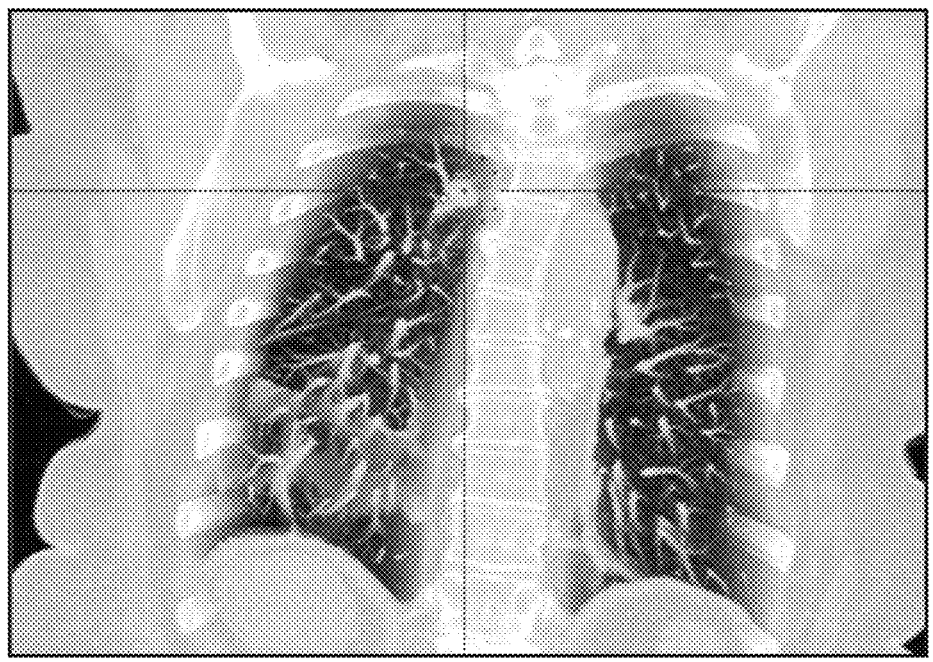
Figure 7C:
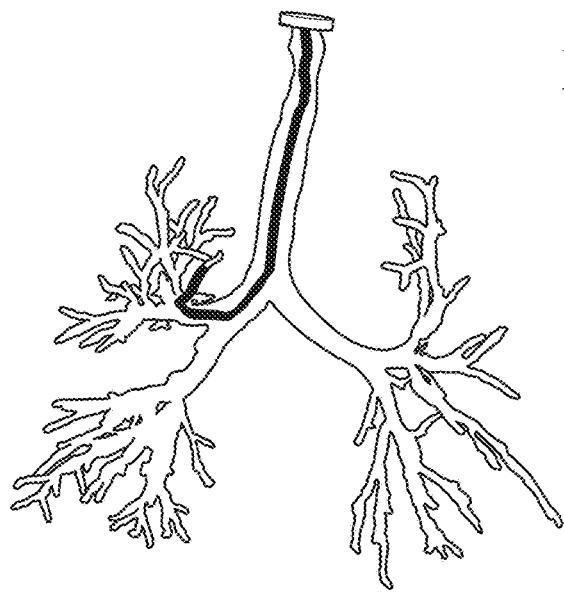
Figure 7D:
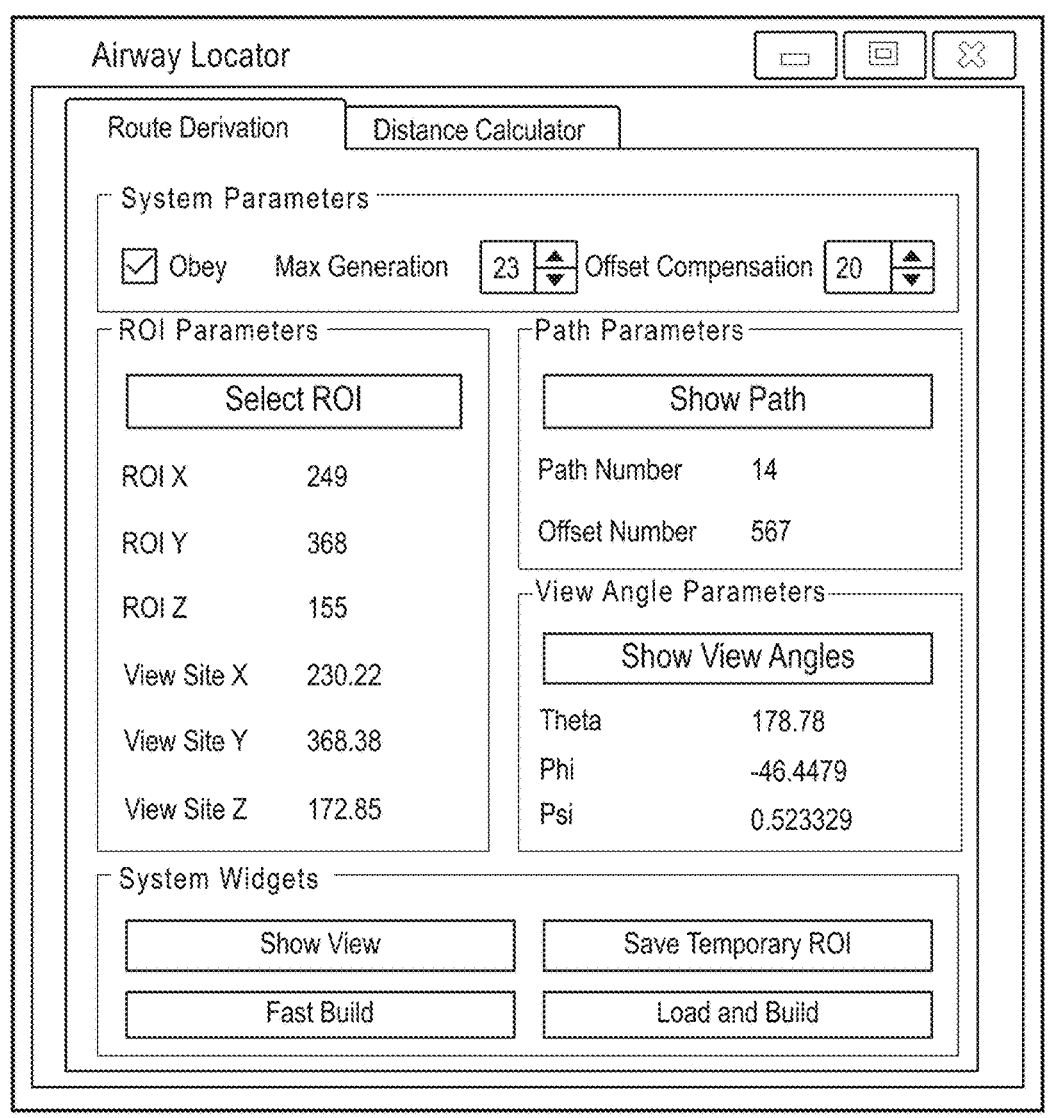

FIGS. 7A-7D show the image-guided bronchoscopy system after the new ROI selection, which is a suspect nodule located in the right upper lobe, and the derived airway route $p_s$ leading to the ROI. The ROI's position is indicated on the 2D CT sagittal and coronal views by red cross-hairs, as well as by the red cube in the 3D rendered airway tree. Also, relevant quantitative data of the ROI appears in Airway Locator tool and its airway route appears in the Airway Locator interface, while the blue line in the 3D Airway Tree Rendering represents the route. FIG. 7A shows 2D CT sagittal section. FIG. 7B shows 2D CT coronal slab view. FIG. 7C shows 3D Airway Tree Rendering. FIG. 7D shows Airway Locator interface.

FIGS. 8A-8D depict the live bronchoscopic guidance toward the new ROI defined in FIGS. 7A-7 at four successive locations along $p_s$. Following the basic procedures discussed in [12, 22, 25], the physician navigates the bronchoscope inside the airway tree phantom along the airway route $p_s$, and the guidance system synchronizes all display views to each location.

Figure 8A:
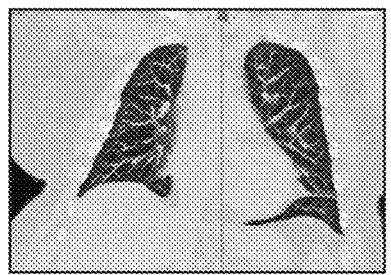
FIGS. 8A-8D show live bronchoscopic guidance toward the new ROI defined in FIGS. 7A-7D. Left view is 2D CT coronal slab; center view is 3D Airway Tree Rendering; right view is a combined live bronchoscopic video view (left) and registered 3D endoluminal VB view (right).
Figure 8A:
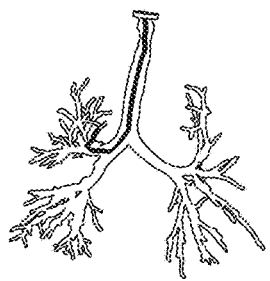
Figure 8A:
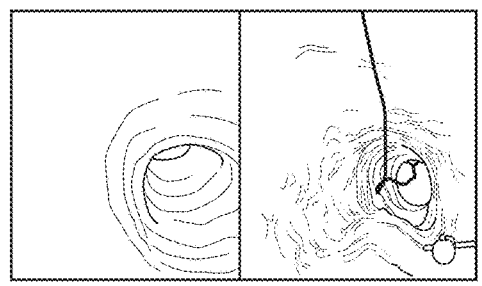
Figure 8B:
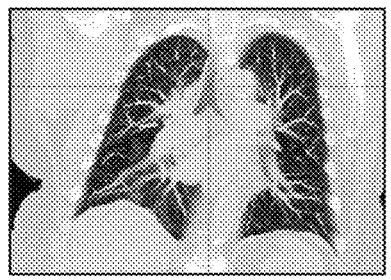
Figure 8B:
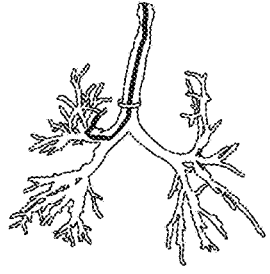
Figure 8B:
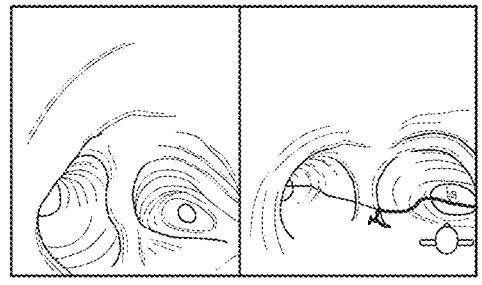
Figure 8C:
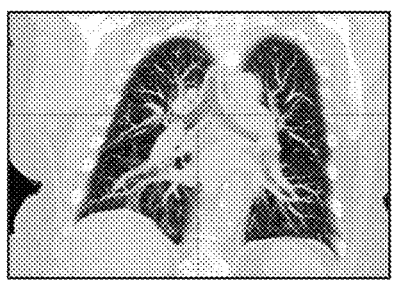
Figure 8C:
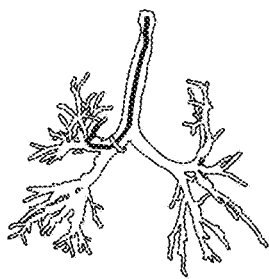
Figure 8C:
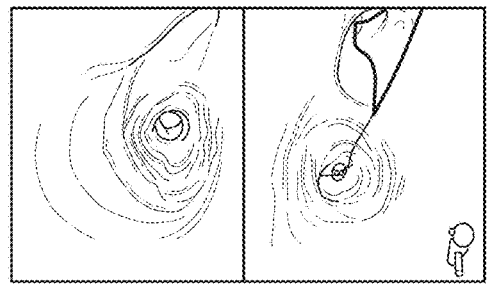
Figure 8D:
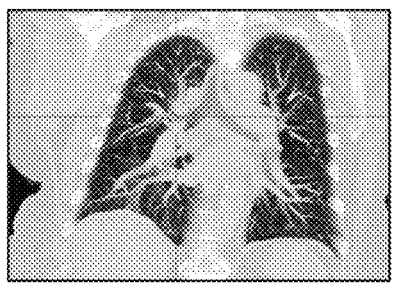
Figure 8D:
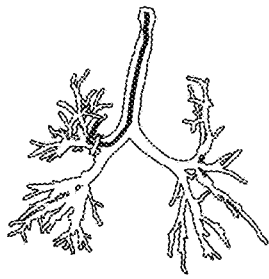
Figure 8D:
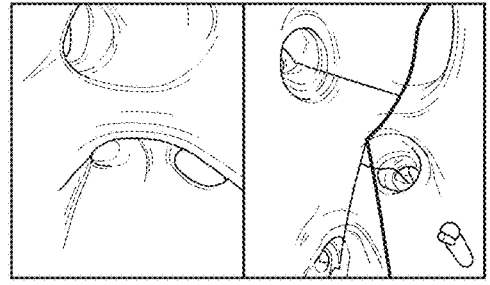

Each of FIGS. 8A, 8B, 8C and 8D depicts the state of the image-guided bronchoscopy system's display at a different view site along the airway guidance route. In FIGS. 8A, 8B, 8C and 8D, left view shows 2D CT coronal slab; center view shows 3D Airway Tree Rendering; right view shows a combined live bronchoscopic video view on the left and registered 3D endoluminal VB view on the right. All views are automatically synchronized to the same location during guided bronchoscopy as indicated by: 1) cross-hairs on the CT slab; 2) orange bronchoscope tip icon on the blue airway guidance route; 3) blue line on the VB view;

FIG. 8A shows guidance system views at the beginning view site $v_1$ in the trachea. FIG. 8B displays views when the physician reaches the distal end of the trachea; this corresponds to view site $v_{232}$ on airway route $p_s$. Following the VB view's blue line path as shown, the physician now continues to navigate the bronchoscope into the right lung. FIG. 8C depicts the system state when the physician reaches the end of the right main bronchus; this corresponds to view site $v_{339}$ of $p_s$. Finally, FIG. 8D illustrates when the bronchoscope has been navigated as close as is feasible to the right secondary bronchi. At this juncture of the airway tree, the physician knows from the VB view to navigate into the upper right branch as indicated by the blue line. As the airway route ends a relatively deep branch, which is too narrow to access during the live procedure, the procedure stops at this point—the Olympus EVIS Exera II BF TYPE P180 4.9 mm bronchoscope used for this study was too large to fit through the remaining airways of $p_s$ in the airway tree phantom.

Example 3: "On the Fly" Guided Bronchoscopy to a Suspect Mucosal Lesion

FIGS. 9A-9B, 10A-10D, and 11a-11C illustrate live extemporaneous ROI selection and subsequent bronchoscopic guidance to a suspect mucosal lesion observed on the airway wall. For the example, we used 3D CT images and bronchoscopic video collected for a lung cancer patient (case 20349-3-90), who was enrolled under informed consent at our University Hospital.

Figure 9A:
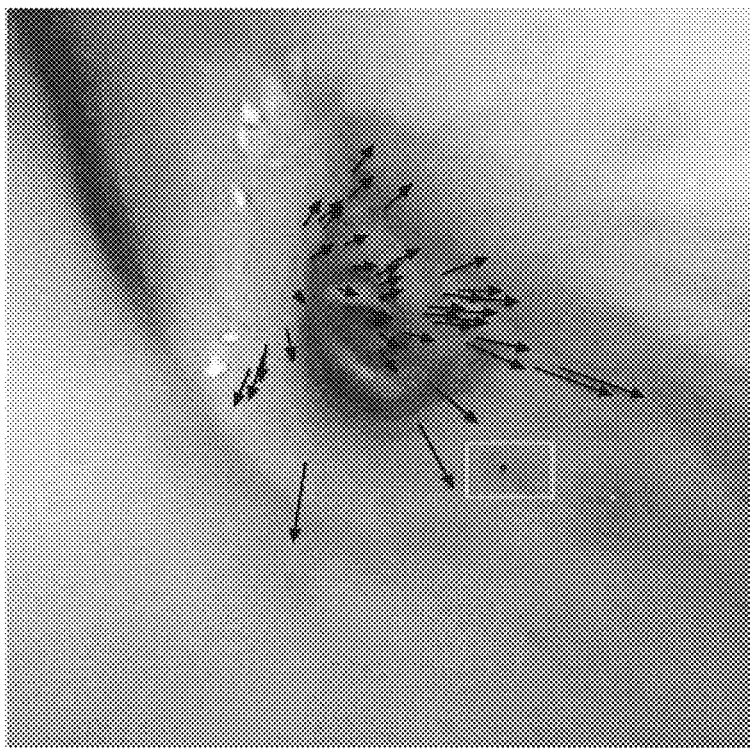
FIG. 9A shows use of Virtual Navigator to select a suspect mucosal lesion site on a bronchoscopy video frame.
Figure 9B:
FIG. 9B shows mapping of the selected lesion site in FIG. 9A onto the surface of the corresponding CT-based VB view.

To begin, the mucosal lesion was first observed in the bronchoscopic video during a routine airway exam. Using video analysis tools integrated into the Virtual Navigator, an ROI was defined at the site of the suspect lesion in a selected video frame [2]. The ROI's location on the video frame was then linked to the patient's 3D CT scan through the endoluminal VB renderer to give known 3D location coordinates for new site s. FIG. 9A shows use of Virtual Navigator to select a suspect mucosal lesion site (green box) on a bronchoscopy video frame. FIG. 9B shows mapping of the selected lesion site onto the surface of the corresponding synchronized CT-based VB view.

Figure 10A:
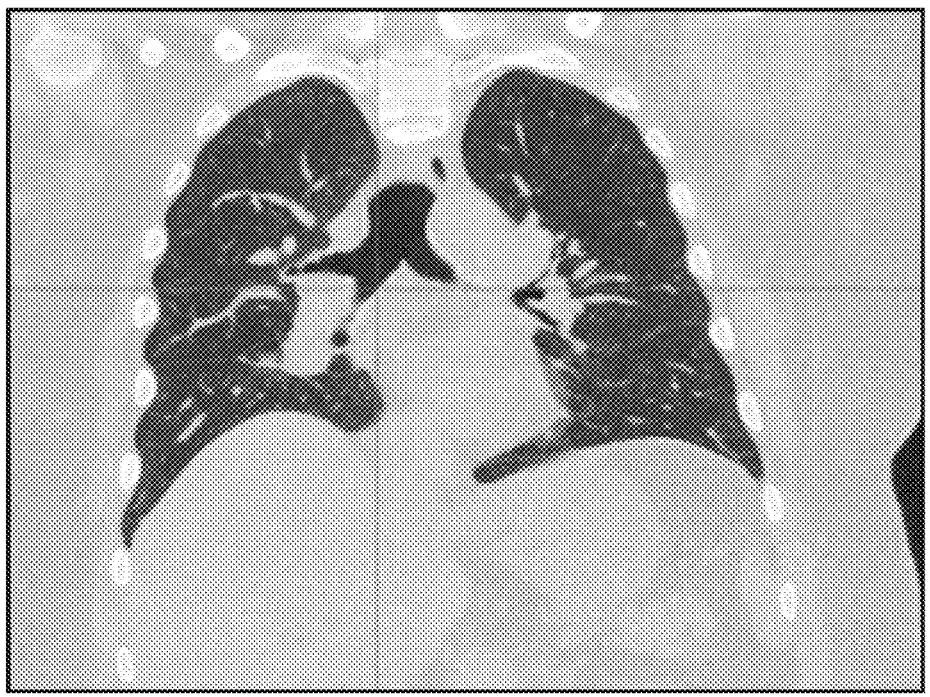
FIGS. 10A-10D show Virtual Navigator guidance system display after deriving a guidance route to the selected mucosal lesion.
Figure 10B:
Figure 10C:
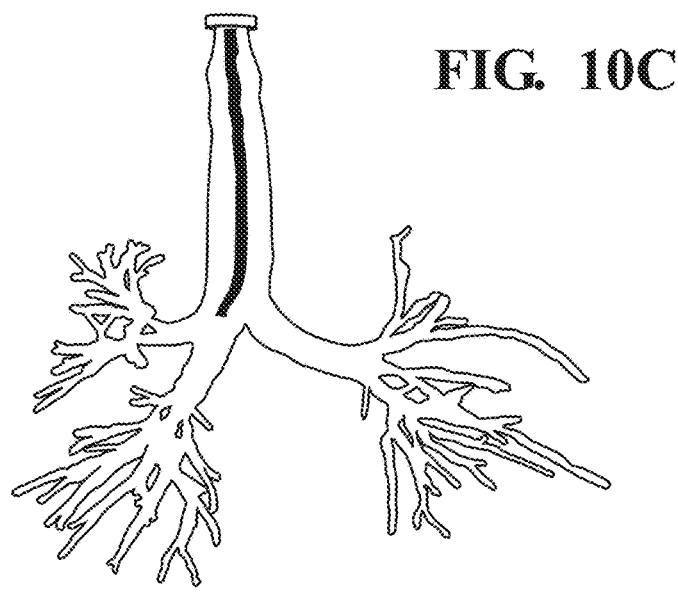
Figure 10D:
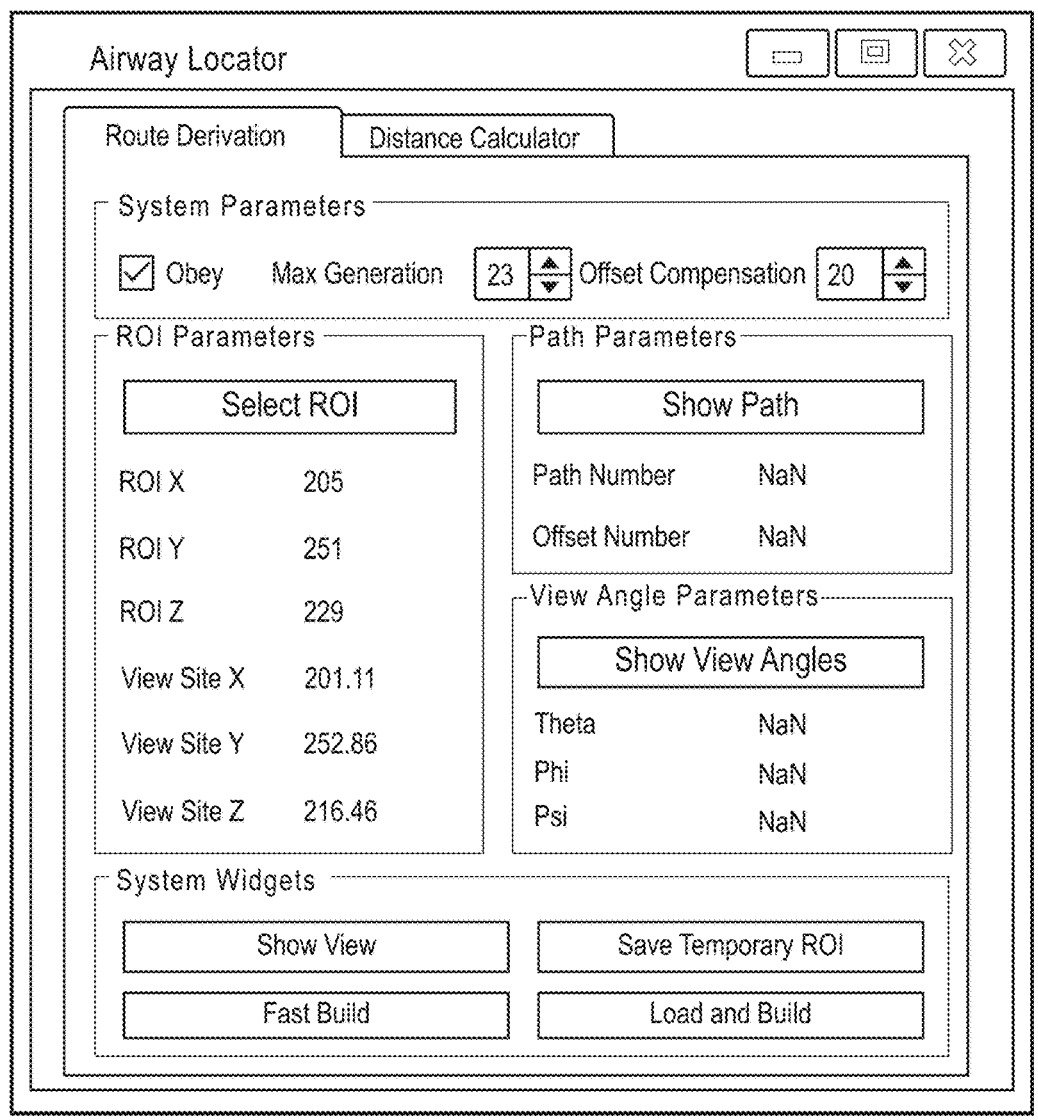

Given the location of the lesion s identified in the live bronchoscopic video, the Airway Locator was then invoked to derive the airway guidance route $p_s$. FIGS. 10A-10D illustrate Virtual Navigator guidance system display after deriving a guidance route to the selected mucosal lesion. Unlike the previous examples where the ROIs were not along the airway walls and were identified using CT data, this ROI was identified with video and located along the airway mucosa. Hence, the red cross-hairs in CT-based views of FIGS. 10A and 10B precisely localize the ROI site at the edge between the airway (dark) and tissue (gray). FIG. 10A shows 2D CT Coronal section. FIG. 10B shows 2D CT Sagittal section. FIG. 10C shows 3D Airway Tree Rendering. FIG. 10D shows Airway Locator interface. The ROI's location is indicated in each view by: 1) red cross-hairs on the Sagittal and Coronal views; 2) red region on the airway wall in the 3D Airway Tree Rendering; 3) quantitative data in the Airway Locator tool.

Figure 11A:
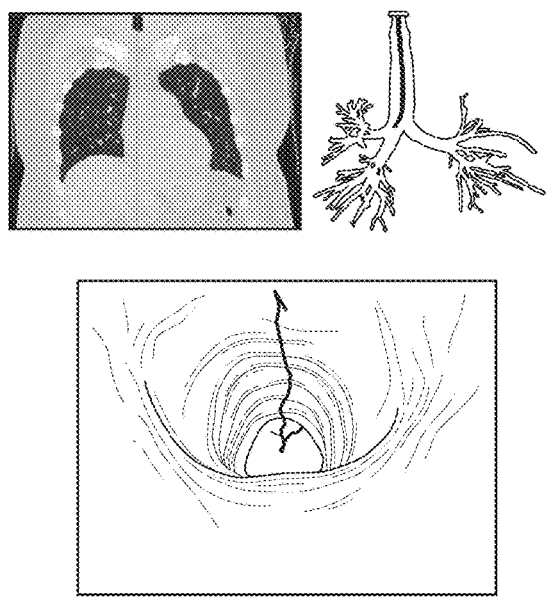
Figure 11A:
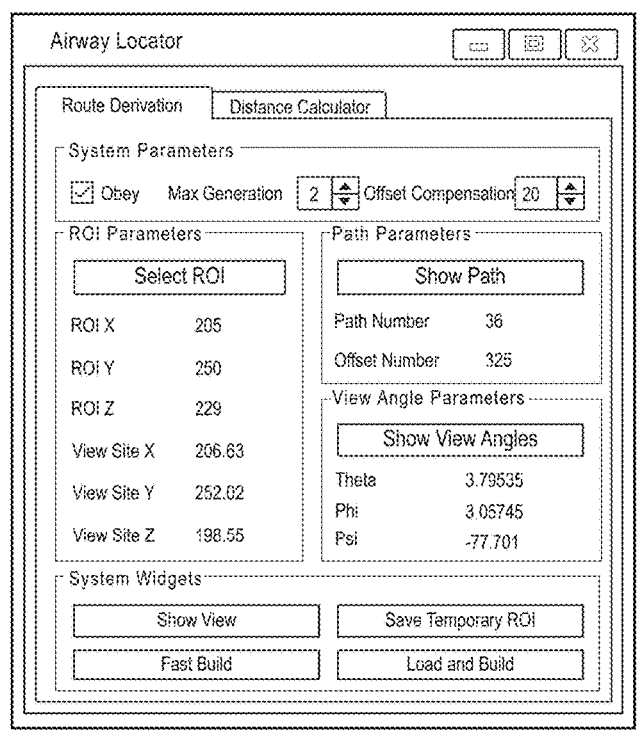

FIGS. 11A-11C next show the simulated guidance procedure, where the physician navigates the bronchoscope along the derived airway route $p_s$ until the lesion's airway wall location is reached.

Each of FIGS. 11A, 11B and 11C depicts the image-guided bronchoscopy system's display at a particular location. For FIGS. 11A-11C, left-top-left view shows 2D CT coronal section, left-top-right view shows 3D Airway Tree Rendering, left-bottom view shows endoluminal renderer (VB view), right view shows Airway Locator interface. All views except the live virtual bronchoscope are automatically synchronized to the same location during guided bronchoscopy as indicated by: 1) cross-hairs on the CT view; 2) orange bronchoscope tip icon on the blue airway guidance route; 3) blue line on the rendered endoluminal view; 4) quantitative data in the Airway Locator tool.

FIG. 11A depicts the bronchoscope stationed at the beginning of the route in the trachea. The bronchoscope is located at view site 11 on original preplanned path $p_3$6. FIG. 11B shows the state of the navigation when the bronchoscope reaches the distal end of the trachea (view site $v_{236}$). As the 3D airway tree and VB view show, the bronchoscope is now clearly close to the lesion; the Airway Locator's Distance Calculator indicates that the remaining distance from current view site to the ROI is 38.8 mm. Lastly, FIG. 11C illustrates when the bronchoscope reaches the last view site $v_{320}$ of the route. Since the Airway Locator has automatically adjusted the view angles of the last view site, the ROI appears centered in the VB view. As indicated by the Airway Locator, the bronchoscope has navigated to within 17.5 mm of the lesion site.

Example 4: "On the Fly" Suspect Mucosal Lesion Localization in NBI Bronchoscopy

Figure 12A:
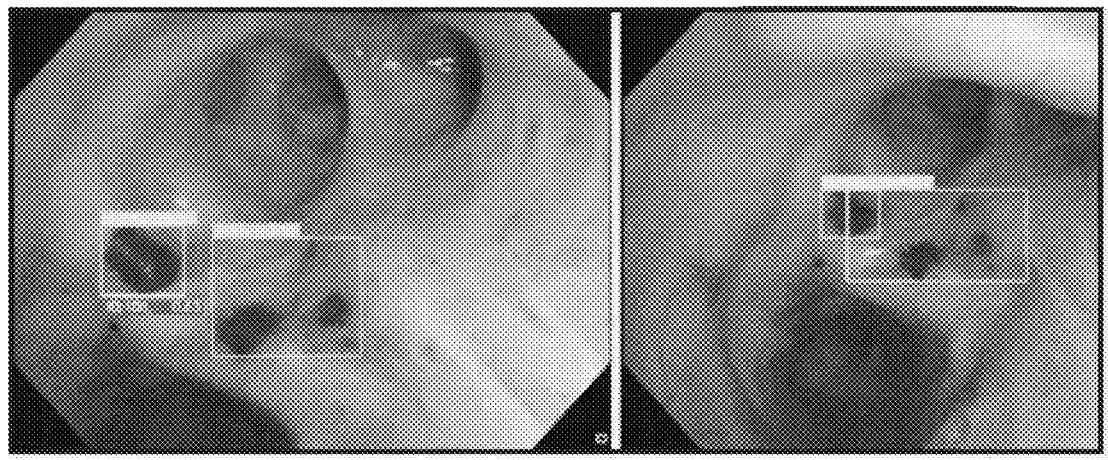
FIG. 12A shows automatic "on the fly" mucosal lesion detection from narrow-band imaging bronchoscopy video.
Figure 12B:
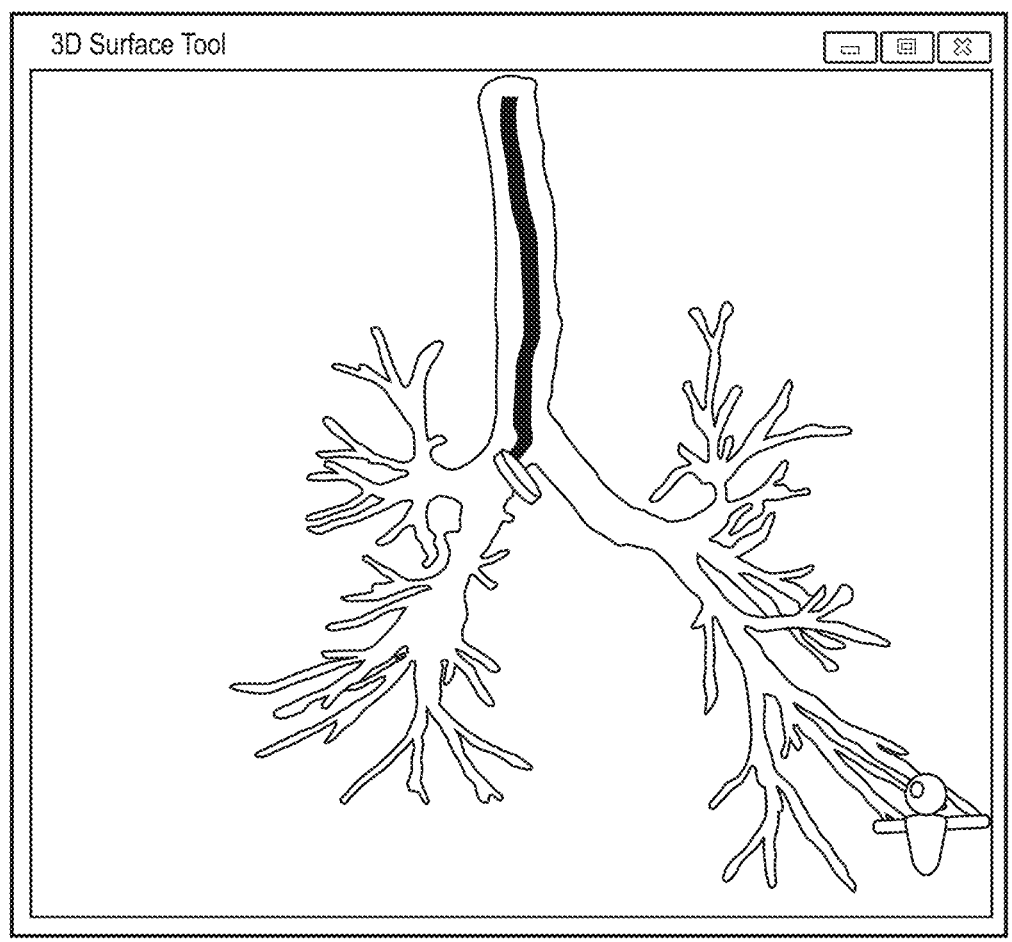
FIG. 12B shows 3D Airway Tree Surface Rendering showing the automatically computed airway route leading to the lesion.
Figure 12C:
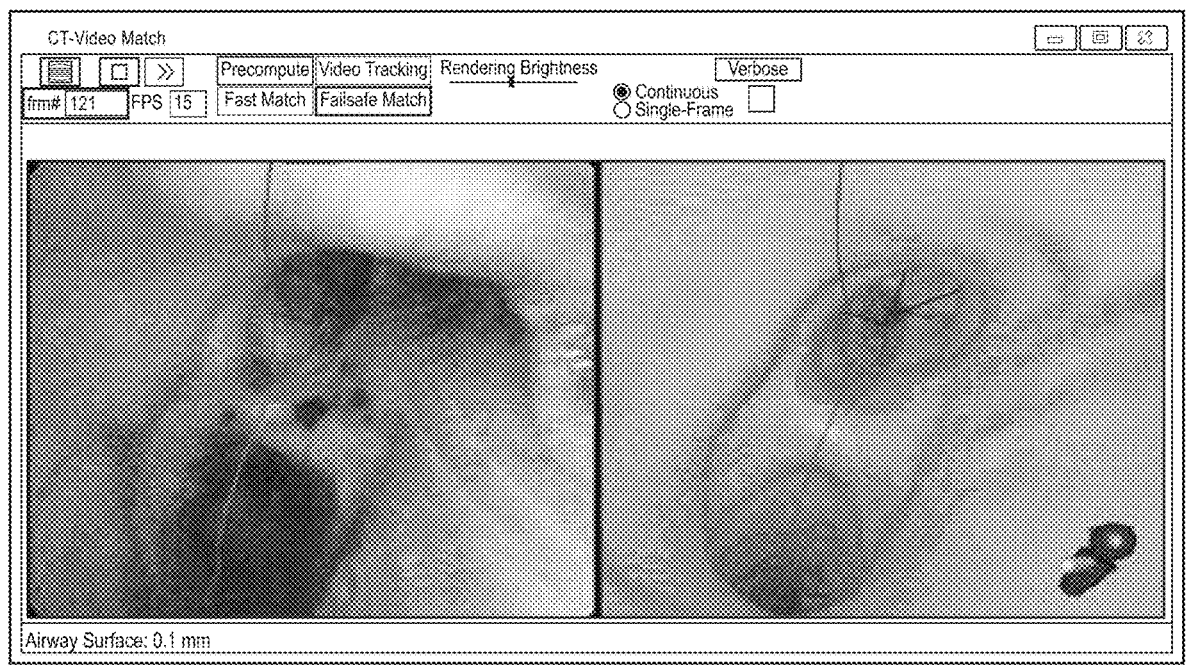
FIG. 12C shows registered live video view and reference CT-based VB view upon returning to the lesion via image-guided bronchoscopy.

FIGS. 12A-12C present an example of automatic "on the fly" mucosal lesion detection and subsequent airway route calculation for narrow-band imaging (NBI) bronchoscopy. NBI bronchoscopy uses an airway illumination source that emphasizes the airway mucosal vasculature [26]. As is well known, the resulting video produces images that show enhanced vasculature structure. Airway wall locations that exhibit such structure often correspond to suspect early lung cancer sites [31].

For our example, we used patient case 21405-197, where the patient was again enrolled in our study under informed consent at our University Hospital. The physician first performed an airway exam of the major airways of the two lungs using an Olympus NBI bronchoscope. The resulting video stream was then automatically processed by our NBI lesion detection software built into the Virtual Navigator system [11]. This resulted in finding a lesion on frame 158 of the airway exam video, while frame 121 depicts the same lesion centered in the video, as shown in the left and right views of FIG. 12A. Using the resulting lesion bounding box as the ROI site, we then again automatically computed an airway route extemporaneously leading from the trachea to this location. FIG. 12B shows 3D Airway Tree Surface Rendering showing the automatically computed airway route (blue line) leading to the lesion. Upon a subsequent return to this site using the new guidance route, the bronchoscope is then navigated to the site of the detected lesion at frame 121. FIG. 12C shows registered live video view and reference CT-based VB view upon returning to the lesion via image-guided bronchoscopy; the green regions indicate the lesion site. For this test, we simulated the return bronchoscopy resulting in FIG. 12C by using the recorded airway exam NBI video as input to our Virtual Navigator system.

6. Discussion

New assisted-bronchoscopy systems, be it an image-guided bronchoscopy system or a robotics-assisted bronchoscopy system, now enable physicians to perform complex bronchoscopic procedures they heretofore could not do. Unfortunately, such systems generally offer no means for making necessary intra-operative adjustments to the procedure plan. Because many such important situations arise, it is vital that a means exist for making such adjustments.

For the first time, the present invention provides a method for deriving an airway route during live bronchoscopy to any selected site observed on the guidance system's display. Given this airway route, the physician can then use the assisted-bronchoscopy system to navigate the bronchoscope to the new site. In this way, the physician can respond to unexpected findings observed during a live procedure and make real-time procedural changes.

It was demonstrated that the presently disclosed Airway Locator methodology offers such a means for creating routes in real-time to newly observed clinical sites of interest. Given this route, the assisted-bronchoscopy system can then guide the physician to the new site.

On another front, endoscopic surgical procedures in other domains (laparoscopy, colonoscopy, cystoscopy), where the physician is required to navigate the device through a hollow organ system, also encounter unexpected observations which require the physician to be able to adjust their plan "on the fly" for the procedure. Our methodology is also readily applicable to these other domains.

As will be clear to those of skill in the art, the embodiments of the present invention illustrated and discussed herein may be altered in various ways without departing from the scope or teaching of the present invention. Also, elements and aspects of one embodiment may be combined with elements and aspects of another embodiment. It is the following claims, including all equivalents, which define the scope of the invention.

REFERENCES

[1] Fumihiro Asano, Naofumi Shinagawa, Takashi Ishida, et al. Virtual bronchoscopic navigation improves the diagnostic yield of radial-endobronchial ultrasound for peripheral pulmonary lesions with involved bronchi on CT. Internal Med., 54(9):1021-1025, 2015.

[2] Patrick D Byrnes and William Evan Higgins. Efficient bronchoscopic video summarization. IEEE Trans. Biomed. Eng., 66(3):848-863, March 2019.

[3] P. Byrnes and W. E. Higgins. A system for endobronchial video analysis. In R. J. Webster and B. Fei, editors, SPIE Medical Imaging 2017: Image-Guided Procedures, Robotic Interventions, and Modeling, volume 10135, pages 101351Q-1-101351Q-9, 2017.

[4] Q. Chang, D. Ahmad, J. Toth, R. Bascom, and W. E. Higgins. ESFPNet: efficient deep learning architecture for real-time lesion segmentation in autofluorescence bronchoscopic video. In B. S. Gimi and A. Krol, editors, SPIE Medical Imaging 2023: Biomedical Applications in Molecular, Structural, and Functional Imaging, volume 12468, 2023.

[5] Q. Chang, P. Byrnes, D. Ahmad, J. Toth, R. Bascom, and W. E. Higgins. Bronchoscopic video synchronization for interactive multimodal inspection of bronchial lesions. In C. A. Linte and J. H. Siewerdsen, editors, SPIE Medical Imaging 2021: Image-Guided Procedures, Robotic Interventions, and Modeling, volume 11598, pages 115981V-1-115981V-11, 2021.

[6] R. Cheirsilp, R. Bascom, T. W. Allen, R. P. M. Mahraj, and W. E. Higgins. Deformable image registration for multimodal lung-cancer staging. In M. Styner and E. Angelini, editors, SPIE Medical Imaging 2016: Image Processing, volume 9784, pages 97843Z-1-97843Z-10, 2016.

[7] R. Cheirsilp, R. Bascom, T. W. Allen, R. P. M. Mahraj, and W. E. Higgins. Deformable image registration for multimodal lung-cancer staging. In M. Styner and E. Angelini, editors, SPIE Medical Imaging 2016: Image Processing, volume 9784, pages 9784Z-1-9784Z-10, 2016.

[8] R. Cheirsilp, Bascom, T. W. Allen, and W. E. Higgins. Thoracic cavity definition for 3D PET/CT analysis and visualization. Comp. Biol. Med., 62:222-238, July 2015.

[9] R. Cheirsilp and W. E. Higgins. Multimodal 3D PET/CT system for bronchoscopic procedure planning. In C. L. Novak and S. Aylward, editors, SPIE Medical Imaging 2013: Computer-Aided Diagnosis, volume 8670, pages 86702X-1-86702X-14, February 2013.

[10] Gerard J Criner, Ralf Eberhardt, Sebastian Fernandez-Bussy, Momen M Wahidi, et al. Interventional bronchoscopy: State-of-the-art review. Am. J. Respir. Crit. Care Med., (1):29-50, July 2020.

[11] V. Daneshpajooh, D. Ahmad, J. Toth, R. Bascom, and W. E. Higgins. Video analysis framework for lesion detection in narrow band imaging bronchoscopy. In B. S. Gimi and A. Krol, editors, SPIE Medical Imaging 2022: Biomedical Applications in Molecular, Structural, and Functional Imaging, volume 12036, pages 120360M-1-120360M-9, 2022.

[12] J. D. Gibbs, M. W. Graham, R. Bascom, D. C. Cornish, R. Khare, and W. E. Higgins. Optimal procedure planning and guidance system for peripheral bronchoscopy. IEEE Trans. Biomed. Engin., 61 (3):638-657, March 2014.

[13] J. D. Gibbs, M. W. Graham, and W. E. Higgins. 3D MDCT-based system for planning peripheral bronchoscopic procedures. Comp. Biol. Med., 39(3):266-279, March 2009.

[14] M. W. Graham, J. D. Gibbs, D. C. Cornish, and W. E. Higgins. Robust 3D Airway-Tree Segmentation for Image-Guided Peripheral Bronchoscopy. IEEE Trans. Medical Imaging, 29(4):982-997, April 2010.

[15] W. R. Grier, M. Saleh, E. Pickering, A Sachdeva, V. K. Holden, and F. Nasim. Evaluation of 3D fluoroscopy aiding robotic assisted bronchoscopy for biopsy of peripheral lung nodules. Am. J. Respir. Crit. Care Med., 205: A3671, May 2022.

[16] W. E. Higgins, R. Cheirsilp, X. Zang, and P. Byrnes. Multimodal system for the planning and guidance of bronchoscopy. In Z. Yaniv and R. Webster, editors, SPIE Medical Imaging 2015: Image-Guided Procedures, Robotic Interventions, and Modeling, volume 9415, pages 941508-1-941508-9, 2015.

[17] W. E. Higgins, J. P. Helferty, K. Lu, S. A. Merritt, L. Rai, and K. C. Yu. 3D CT-video fusion for image-guided bronchoscopy. Comput. Med. Imaging Graph., 32(3):159-173, April 2008.

[18] D. Himeji, M. Oki, H. Saka, T. Imabayashi, Y. Nishii, and M. Ando. A multicenter prospective study on addition of ultrathin bronchoscopy to thin bronchoscopy when evaluating peripheral pulmonary lesions. Am. J. Respir. Crit. Care Med., 205: A3673, May 2022.

[19] E. Ho, R. J. Cho, J. Keenan, and S. Murgu. The feasibility of using the â€œvessel signâ€• for pre-procedural planning in navigation bronchoscopy for peripheral pulmonary lesion sampling: A dual-center retrospective study. Am. J. Respir. Crit. Care Med., 205: A3670, May 2022.

[20] T. Inage, T. Nakajima, I Yoshino, and K. Yasufuku. Early lung cancer detection. Clin. Chest Med., 39:45-55, 2018.

[21] T. Inoue, T. Kawamura, K. Kunimasa, M. Tamiya, H. Kuhara, K. Nishino, S. Odani, F. Imamura, T. Kumagai, and K. Miyake. Manual route modification using an oblique method following automatic virtual bronchoscopic navigation. Medicine, 101(17):1-7, 2022.

[22] R. Khare, R. Bascom, and W. E. Higgins. Hands-free system for bronchoscopy planning and guidance. IEEE Trans. Biomed. Eng., 62(12):2794-2811, 2015.

[23] T. Kuhlengel, R. Bascom, and W. Higgins. Efficient procedure planning for comprehensive lymph node staging bronchoscopy. J. Med. Imaging, 9(5):055001-1-055001-22, September 2022.

[24] K. Lu and W. E. Higgins. Interactive segmentation based on the live wire for 3D CT chest image analysis. Int. J. Computer Assisted Radiol. Surgery, 2(3-4):151-167, December 2007.

[25] S. A. Merritt, R. Khare, R. Bascom, and W. E. Higgins. Interactive CT-video registration for image-guided bronchoscopy. IEEE Trans. Medical Imaging, 32(8):1376-1396 August 2013.

[26] T. Nakajima and K. Yasufuku. Early lung cancer detection. In Jose Pablo Diaz-Jimenez and Alicia Rodriguez, editors, Interventions in Pulmonary Medicine, pages 245-256. Springer, 2018.

[27] M. Oki, H. Saka, Y. Kogure, H. Niwa, A. Yamada, A. Torii, and C. Kitagawa. Ultrathin bronchoscopic cryobiopsy of peripheral pulmonary lesions. Am. J. Respir. Crit. Care Med., 205: A3674, May 2022.

[28] P. J. Reynisson, H. O. Leira, T. N. Hernes, E. F. Hofstad, et al. Navigated bronchoscopy: a technical review. J. Bronchology Interv. Pulmonol., 21(3):242-264, July 2014.

[29] J. Z. Turlington and W. E. Higgins. New techniques for efficient sliding thin-slab volume visualization. IEEE Trans. Medical Imaging, 20(8):823-835, August 2001.

[30] M. M. Wahidi, F. J. F. Herth, A. Chen, G. Cheng, and L. Yarmus. State of the art: Interventional pulmonology. Chest, 157(3):724-736, March 2020.

[31] Juan P Wisnivesky, Rex Chin-Wei Yung, Praveen N Mathur, and Javier J Zulueta. Diagnosis and treatment of bronchial intraepithelial neoplasia and early lung cancer of the central airways: Diagnosis and management of lung cancer: American college of chest physicians evidence-based clinical practice guidelines. Chest, 143(5_suppl): e263S-e277S, May 2013.

[32] K. C. Yu, E. L. Ritman, and W. E. Higgins. 3D model-based vasculature analysis using differential geometry. IEEE Int. Symp. Biomedical Imaging, pages 177-180, April. 15-18, 2004.

[33] X. Zang, R. Cheirsilp, P. D. Byrnes, W. Higgins, et al. Image-guided EBUS bronchoscopy system for lung-cancer staging. Inform. Med. Unlocked, 25(100665):1-13, 2021.

[34] X. Zang, J. D. Gibbs, R. Cheirsilp, P. D. Byrnes, J. Toth, R. Bascom, and W. E. Higgins. Optimal route planning for image-guided ebus bronchoscopy. Comput. Biol. Med., 112(7):103361, September 2019.

The invention claimed is:

1. A system for computing a new guidance route extemporaneously through a hollow organ system of a patient to an unplanned region of interest (ROI), comprising:
a guidance system, comprising:
an endoscope operative to navigate within the hollow organ system;
a display device operative to display various graphical visualization tools depicting 2D computed tomography/positron emission tomography (CT/PET) sections, a sliding thin-slab view, an endoluminal renderer, a 2D projection view, a tube view, a global 3D hollow organ rendering, or real-time video streams of the endoscope;
a memory storing a procedure plan and updates to the procedure plan;
a processor in communication with the memory and the display device, the processor being operative to perform the steps of:
loading planning information previously computed offline prior to a live endoscopic procedure into a guidance system, the planning information representing the hollow organ system, centerlines within the hollow organ system, and a guidance route leading to a preselected ROI, based on a three-dimensional (3D) radiologic imaging data of the patient, wherein the centerlines consist of a set of directed paths $p_i$, with each path $p_i$ consisting of a set of view sites visited once and only once along the path, originating at the beginning branch of the hollow organ system and terminating at a distal hollow organ branch, each view site consisting of a vector and an imaging camera's orientation during visualization along the path, the vector specifying coordinates and orientation angles;

automatically computing a new guidance route that leads to the unplanned ROI observed during the live endoscopic procedure on the display device, comprising the steps of:
i. finding a view site $v_c$ closest to the unplanned ROI;
ii. selecting a path $p_i$ containing the view site $v_c$ among the set of directed paths;
iii. deriving a compensation of $\epsilon$ view sites resulting in a new view site $v_s = v_{c-\epsilon}$ as an initial final view site for a preliminary guidance route $p_s$ leading to the unplanned ROI, the new view site $v_s$ preceding $v_c$ by $\epsilon$ view sites in the selected path $p_i$, the preliminary guidance route $p_s$ meeting a constraint requirement;
iv. computing the vector $z=s-v_s$ for the unplanned ROI that starts at view site $v_s$ and points at the unplanned ROI, therefore obtaining a final view site $v_f$ for the preliminary guidance route $p_s$;
v. replacing $v_s$ with the final view site $v_f$ in the preliminary guidance route $p_s$, providing the new guidance route leading to the unplanned ROI; and
guiding the endoscope along the new guidance route through the hollow organ system to reach unplanned ROI.

2. The system according to claim 1, wherein the unplanned ROI is identified on a 2D computed tomography (CT) section, a fused 2D CT/PET section, a sliding thin-slab view, an endoluminal renderer, a 2D MRI section, a 2D projection view, a tube view, or a video frame of an endoscopic video stream.

3. The system according to claim 1, wherein the unplanned ROI is identified prior to the onset of the live endoscopic procedure or during the live endoscopic procedure.

4. The system according to claim 1, wherein the processor is further operative to perform the steps of computing a distance needed to travel from a view site on the new guidance route to the unplanned ROI.

5. The system according to claim 1, wherein the constraint requirement includes airway dimensions and a requirement that a tip of the endoscope must be able to fit through the airways.

6. A method for automatically computing a new guidance route extemporaneously through a hollow organ system of a patient to a previously unplanned region of interest (ROI) observed during a live endoscopic procedure performed by a physician, the method comprising the steps of:
loading planning information computed offline prior to the live endoscopic procedure into a guidance system, the planning information representing the hollow organ system, centerlines within the organ system, and a preplanned guidance route leading to a preselected ROI, based on a three-dimensional (3D) radiologic image of the patient, wherein the centerlines consist of a set of directed paths $p_i$, with each path $p_i$ consisting of a set of view sites visited once and only once along the path, originating at a beginning branch of the hollow organ system and terminating at a distal hollow organ branch, each view site consisting of a vector and an imaging camera's orientation during visualization along the path, the vector specifying coordinates and orientation angles;
loading image sources of the patient, the image sources including the 3D radiologic image, other 3D radiologic images, and endoscopic video generated during the live endoscopic procedure;
providing graphical tools constituting the guidance system's visual display, the graphical tools depicting various visualizations of the patient, based on the image sources;
navigating the endoscope to the preselected ROI along the preplanned guidance route;
identifying a new unplanned ROI on one of the graphical tools of the visual display while navigating the endoscope to the preselected ROI;
correlating the site identified on the graphical tool representing the unplanned ROI to the centerlines of the planning information to give a closest view site $v_c$ to unplanned ROI;
automatically computing a new guidance route through the hollow organ system leading to unplanned ROI, based on the closest view site $v_c$, unplanned ROI, planning information, and image sources, comprising the steps of:
i. selecting a path $p_i$ containing the view site $v_c$ among the set of directed paths;
ii. deriving a compensation of $\epsilon$ view sites resulting in a new view site $v_s = v_{c-\epsilon}$ as an initial final view site for a preliminary guidance route $p_s$ leading to the unplanned ROI, the new view site $v_s$ preceding $v_c$ by $\epsilon$ view sites in the selected path $p_i$, the preliminary guidance route $p_s$ meeting a constraint requirement;
iii. computing the vector $z=s-v_s$ for the unplanned ROI that starts at view site $v_s$ and points at the unplanned ROI, therefore obtaining a final view site $v_f$ for the preliminary guidance route $p_s$; and
iv. replacing $v_s$ with the final view site $v_f$ in the preliminary guidance route $p_s$, providing the new guidance route leading to the unplanned ROI;
navigating the endoscope along the new guidance route through the hollow organ system to reach unplanned ROI.

7. The method according to claim 6, wherein the image sources are a chest computed tomography (CT) scan, positron emission tomography (PET) scan, magnetic resonance imaging (MRI) scan, white-light bronchoscopic video, convex-probe endobronchial ultrasound video, radial-probe endobronchial ultrasound video, autofluorescence bronchoscopy video, or narrow-band imaging bronchoscopy video.

8. The method according to claim 6, wherein the unplanned ROI is identified on a 2D CT section, a fused 2D CT/PET section, a sliding thin-slab view, an endoluminal renderer, a 2D MRI section, a 2D projection view, a tube view, or a video frame of an endoscopic video stream.

9. The method according to claim 6, wherein the unplanned ROI is identified prior to the onset of the live endoscopic procedure or during the live endoscopic procedure.

10. The method according to claim 6, further comprising guiding use of a second supplemental device to navigate the new guidance route.

11. The method according to claim 10, wherein the second supplemental device is selected from an optical coherence tomography probe, a cryotherapy probe, a convex endobronchial ultrasound probe, a radial endobronchial ultrasound probe, or a neodymium-doped yttrium aluminum garnet (Nd:Yag) laser probe.

12. The method according to claim 6, further comprising previewing the new guidance route using the graphical tools of the guidance system prior to guiding the endoscope along the new guidance route.

13. The method according to claim 6, further comprising saving any unplanned ROI and associated guidance route as part of a patient case study for future reference.

14. The method according to claim 6, further comprising computing a distance needed to travel from a view site on the guidance route to the unplanned ROI.

15. The method according to claim 6, wherein the constraint requirement includes airway dimensions and a requirement that a tip of the endoscope must be able to fit through the airways.

16. The method according to claim 6, wherein the endoscope is a bronchoscope, colonoscope, laparoscope, or cystoscope.

17. The method according to claim 6, wherein the hollow organ system includes the lung airways or hollow areas in the colon, stomach, bladder, or pelvis/abdomen.

18. The method according to claim 6, where the live endoscopic procedure is performed by a robotics system.

\* \* \* \* \*